US007442136B2

(12) United States Patent
Ichida et al.

(10) Patent No.: US 7,442,136 B2
(45) Date of Patent: Oct. 28, 2008

(54) MOTORIZED BICYCLE DERAILLEUR ASSEMBLY

(75) Inventors: Tadashi Ichida, Nara (JP); Kazuhiro Fujii, Osaka (JP)

(73) Assignee: Shimano Inc., Osaka (JP)

( * ) Notice: Subject to any disclaimer, the term of this patent is extended or adjusted under 35 U.S.C. 154(b) by 682 days.

(21) Appl. No.: 11/061,752

(22) Filed: Feb. 18, 2005

(65) Prior Publication Data

US 2006/0189421 A1 Aug. 24, 2006

(51) Int. Cl.
*F16H 9/00* (2006.01)
*F16H 59/00* (2006.01)
*F16H 61/00* (2006.01)
*F16H 63/00* (2006.01)

(52) U.S. Cl. .......................... 474/82; 474/80; 74/502.2

(58) Field of Classification Search ............ 474/78-82; 74/500.5, 502.2; 701/51; 475/149; 280/236, 280/238, 260, 261
See application file for complete search history.

(56) References Cited

U.S. PATENT DOCUMENTS

| | | | | |
|---|---|---|---|---|
| 3,730,012 | A | 5/1973 | Juy | |
| 3,919,891 | A | 11/1975 | Stuhlmuller et al. | |
| 4,143,557 | A * | 3/1979 | Wakebe et al. | 474/80 |
| 4,199,997 | A * | 4/1980 | Isobe | 474/82 |
| 5,213,548 | A | 5/1993 | Colbert et al. | |
| 5,470,277 | A * | 11/1995 | Romano | 474/70 |
| 5,480,356 | A * | 1/1996 | Campagnolo | 474/70 |
| 5,514,041 | A | 5/1996 | Hsu | |
| 5,518,456 | A | 5/1996 | Kojima et al. | |
| 5,577,969 | A | 11/1996 | Watarai | |
| 5,681,234 | A | 10/1997 | Ethington | |
| 5,860,880 | A | 1/1999 | Oka | |
| 5,873,283 | A | 2/1999 | Chen et al. | |
| 6,073,730 | A | 6/2000 | Abe | |
| 6,282,976 | B1 | 9/2001 | Jordan et al. | |
| 6,290,621 | B1 * | 9/2001 | Ichida | 474/80 |
| 6,619,154 | B2 | 9/2003 | Campagnolo | |
| 6,623,389 | B1 * | 9/2003 | Campagnolo | 474/70 |
| 6,629,574 | B2 | 10/2003 | Turner | |
| 6,629,903 | B1 * | 10/2003 | Kondo | 474/82 |
| 6,648,782 | B2 | 11/2003 | Valle | |
| 6,679,797 | B2 * | 1/2004 | Valle | 474/80 |

(Continued)

FOREIGN PATENT DOCUMENTS

| | | | |
|---|---|---|---|
| DE | 4340471 | C1 | 2/1995 |

(Continued)

*Primary Examiner*—Robert A Siconolfi
*Assistant Examiner*—Thomas W Irvin
(74) *Attorney, Agent, or Firm*—Global IP Counselors, LLP

(57) ABSTRACT

A motorized bicycle front derailleur assembly is provided that includes a motor unit, a front derailleur and a motor linkage. The motor unit is configured to rotate an output shaft in first and second opposite rotational directions. The front derailleur includes a fixing body configured to be mounted to a bicycle frame, inner and outer links pivotally coupled to the fixing body at first and second pivot points, and a chain guide pivotally coupled to the inner and outer links to move between an inner shift position and an outer shift position. The first pivot point is located laterally closer to a center plane of the bicycle frame than the second pivot point. The motor linkage is operatively coupled to the output shaft of the motor unit and the inner link to move the chain guide between the inner and outer shift positions upon rotation of the output shaft.

15 Claims, 34 Drawing Sheets

U.S. PATENT DOCUMENTS

| | | | | |
|---|---|---|---|---|
| 6,682,087 | B1 | 1/2004 | Takeda | |
| 6,767,308 | B2 | 7/2004 | Kitamura | |
| 2002/0190173 | A1 | 12/2002 | Fujii | |
| 2003/0092519 | A1 * | 5/2003 | Fukuda | 474/70 |
| 2004/0063528 | A1 | 4/2004 | Campagnolo | |
| 2005/0197222 | A1 * | 9/2005 | Tatsumi | 474/80 |
| 2005/0239587 | A1 * | 10/2005 | Ichida et al. | 474/82 |
| 2005/0266945 | A1 * | 12/2005 | Meggiolan | 474/70 |

FOREIGN PATENT DOCUMENTS

| | | | |
|---|---|---|---|
| EP | 1010613 | A1 | 6/2000 |
| EP | 1-103-456 | A2 | 5/2001 |
| EP | 1310423 | A2 | 5/2003 |
| EP | 1357023 | A1 | 10/2003 |
| WO | WO- 95/26900 | A1 | 10/1995 |
| WO | WO-97/07919 | | 3/1997 |

* cited by examiner

MOTORIZED BICYCLE DERAILLEUR ASSEMBLY

BACKGROUND OF THE INVENTION

1. Field of the Invention

This invention generally relates to a motorized bicycle derailleur assembly. More specifically, the present invention relates to a motorized bicycle front derailleur assembly with a drive link coupled to an inner link to move the chain guide laterally outwardly when a pulling force is applied to the inner link.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In fact, bicycles have recently been equipped with electrical components to make riding easier and more enjoyable for the rider. Some bicycles are equipped with automatic shifting units that are automatically adjusted according to the riding conditions by a cycle computer or control unit. In particular, the front and rear derailleurs have recently been automated.

Generally speaking, the front derailleur is secured to the seat tube of the bicycle frame or the bottom bracket, while the rear derailleur is secured to the rear triangle of the frame. In either case, a derailleur includes a fixed or base member non-movably secured to a bicycle frame, and a movable member supported to be movable relative to the fixed member via a linkage. The movable member typically has a chain guide with a pair of cage plates for moving a chain between the front or rear sprockets. The movable member is usually biased in a given direction relative to the fixed member by a spring. The movable member is usually moved relative to the fixed member by pulling and/or releasing a shift control cable that is coupled to the respective derailleur. In a manually operated derailleur, a control cable is connected to one of the pivotal links to apply a torque thereto, thereby causing the links to move the movable member. The control cable is fixed to the link in a position such that an operating force applied to the control cable is converted into a link swinging torque. The movement of the control cable is typically controlled by a shift operating device that has one or more levers, a winding member and in indexing mechanism in a conventional manner.

In recent years, derailleurs have been motorized. In a motorized derailleur, a motor is typically used to pull and release a control cable to move the movable member, or the motor is connected by a drive train (transmission) to the derailleur without a conventional control cable to move the movable member. In either case, the motor is typically an electric motor that is operatively coupled to a control unit. The control unit can automatically control the motor, and thus, automatically control movement of the movable member of the derailleur. Alternatively, electrical shift buttons can be provided, which are operatively coupled to the control unit such that the rider can control the shifting of the derailleur.

While these prior motorized derailleurs work relatively well, they do suffer from some deficiencies. In particular, these prior motorized derailleurs do not always operate as reliably as desired by some riders. Moreover, these prior motorized derailleurs are not always as easily adjusted as desired by some riders. Furthermore, these prior derailleurs are not always as simple and inexpensive to manufacture and assemble as desired. Finally, these prior motorized derailleurs often have a motor unit assembly, which requires numerous fasteners to couple the parts together, which can be relatively complicated.

It will be apparent to those skilled in the art from this disclosure that there exists a need for an improved motorized bicycle derailleur assembly. This invention addresses this need in the art as well as other needs, which will become apparent to those skilled in the art from this disclosure.

SUMMARY OF THE INVENTION

One object of the present invention is to provide a motorized bicycle front derailleur assembly, which is reliable.

Another object of the present invention is to provide a motorized bicycle front derailleur assembly that is configured and arranged to be easily adjusted.

Another object of the present invention is to provide a motorized bicycle front derailleur assembly that includes a jamming protection connection.

Yet another object of the present invention is to provide a motorized bicycle front derailleur assembly that is relatively simple and inexpensive to manufacture and assemble.

The foregoing objects can basically be attained by providing a motorized bicycle front derailleur assembly that includes a motor unit, a front derailleur and a motor linkage. The motor unit is configured and arranged to rotate an output shaft in a first rotational direction and a second rotational direction that is opposite the first rotational direction. The front derailleur includes a fixing body configured to be mounted to a bicycle frame, an inner link pivotally coupled to the fixing body at a first pivot point, an outer link pivotally coupled to the fixing body at a second pivot point and a chain guide pivotally coupled to the inner and outer links to move between an inner shift position and an outer shift position. The first pivot point is located laterally closer to a center plane of the bicycle frame than the second pivot point. The motor linkage is operatively coupled to the output shaft of the motor unit and the inner link of the front derailleur to move the chain guide from the inner shift position to the outer shift position upon rotation of the output shaft in the first rotational direction and to move the chain guide from the outer shift position to the inner shift position upon rotation of the output shaft in the second rotational direction.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
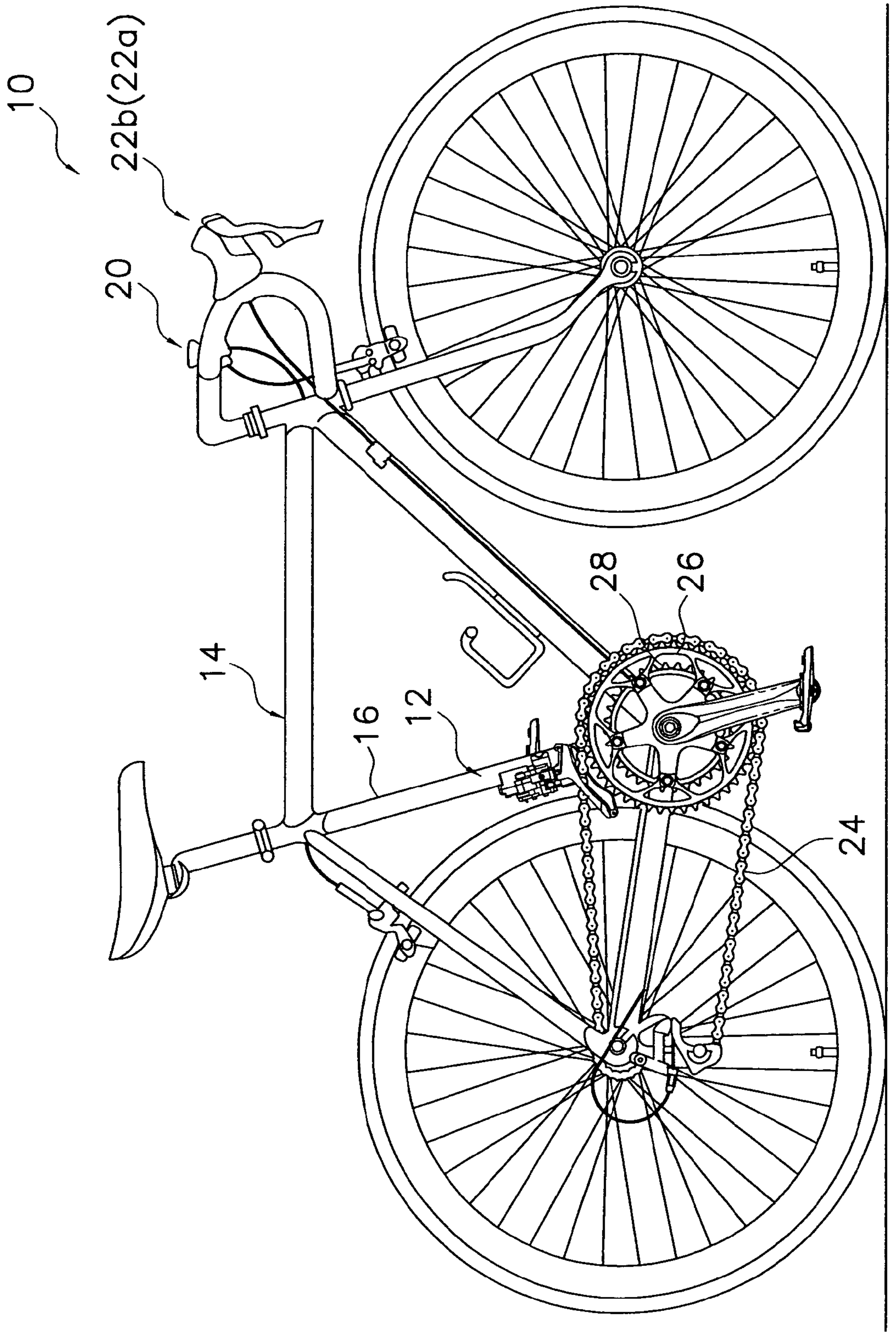
FIG. 1 is a side elevational view of a bicycle equipped with a motorized front derailleur assembly in accordance with the present invention.
Figure 2:
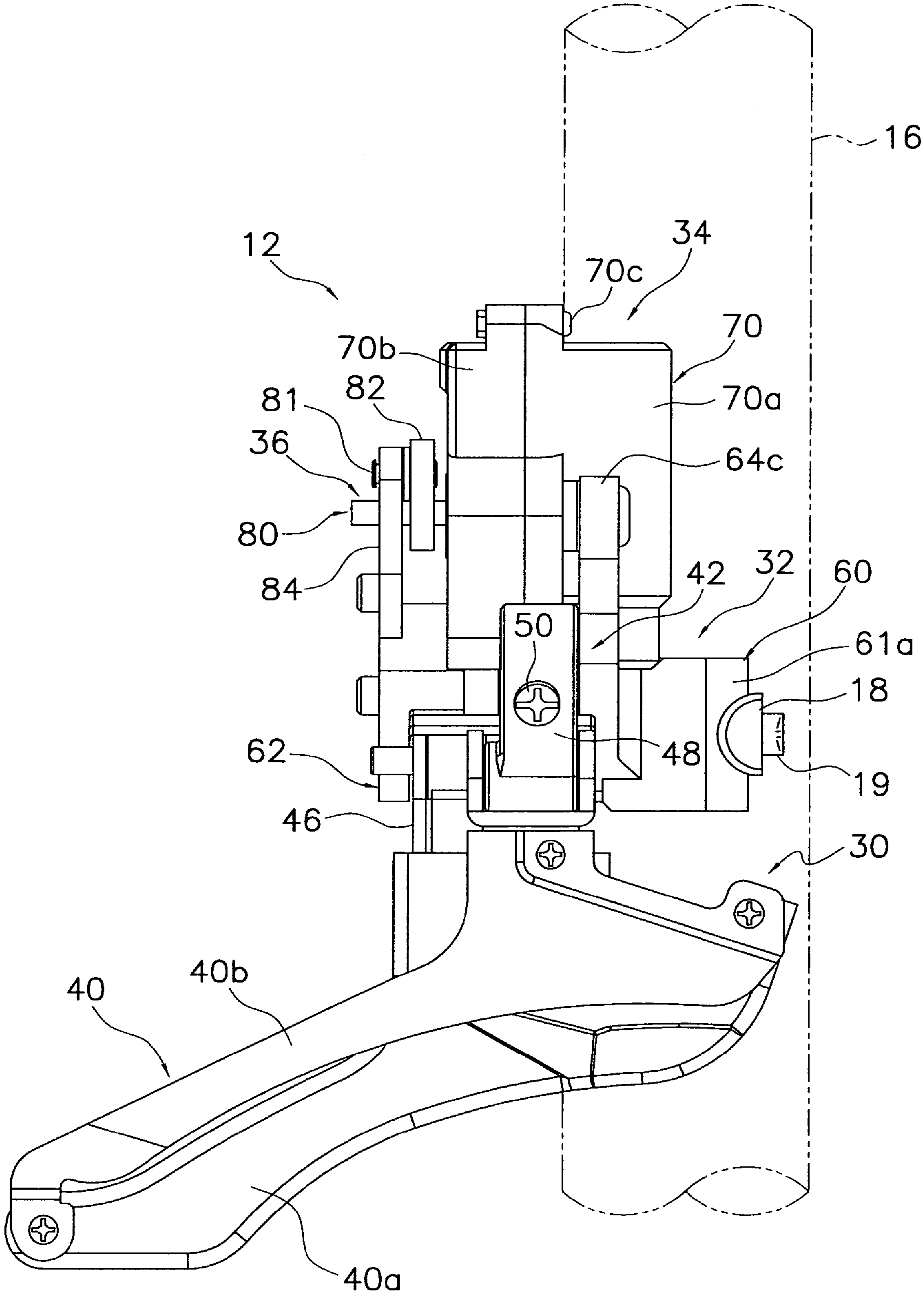
FIG. 2 is an enlarged outer side elevational view of the motorized front derailleur assembly illustrated in FIG. 1 with the chain guide in a low shift position, and with the motor unit cover removed for the purpose of illustration.
Figure 3:
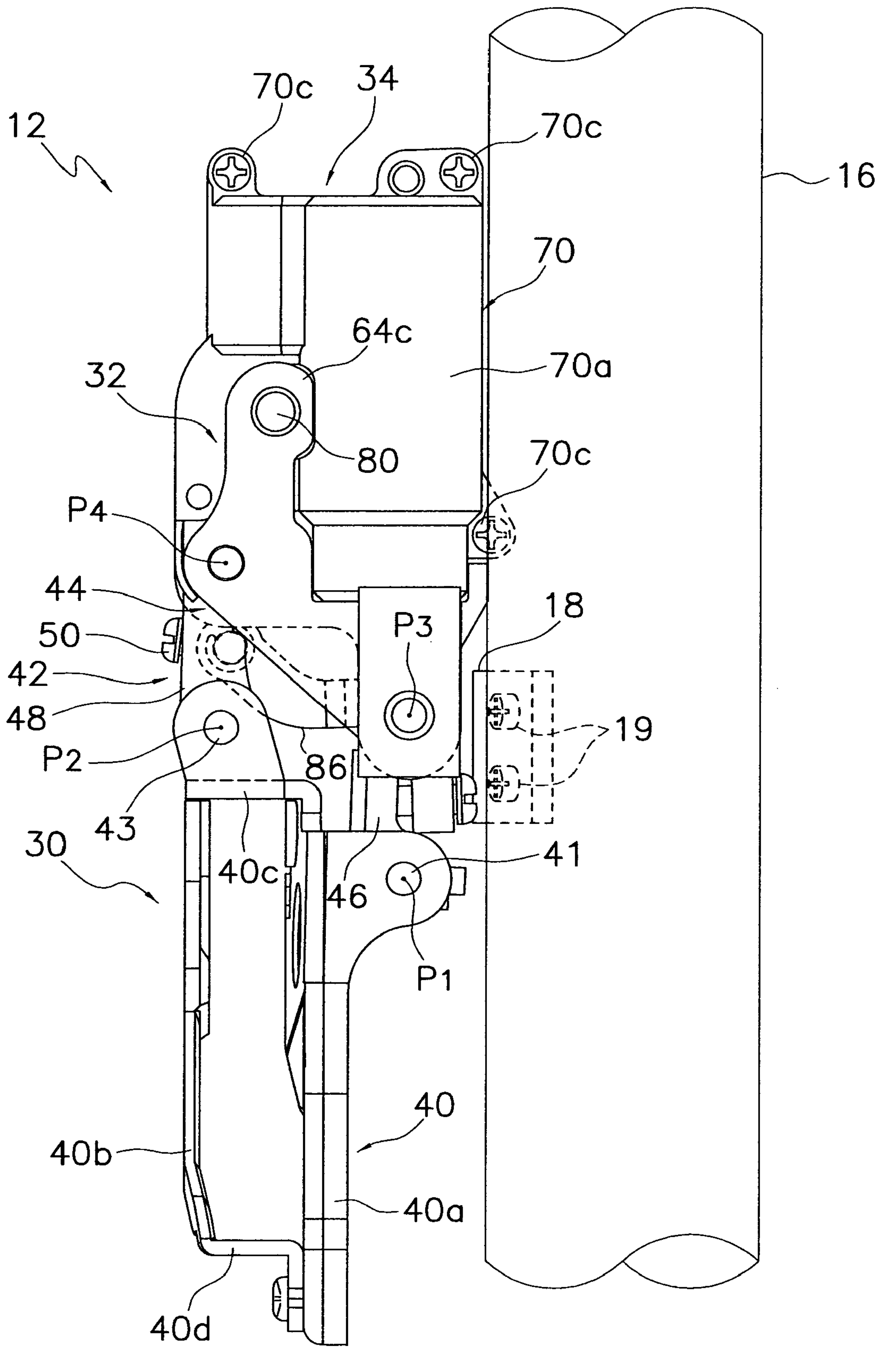
FIG. 3 is a front elevational view of the motorized front derailleur assembly illustrated in FIG. 2 with the chain guide in the low shift position.
Figure 4:
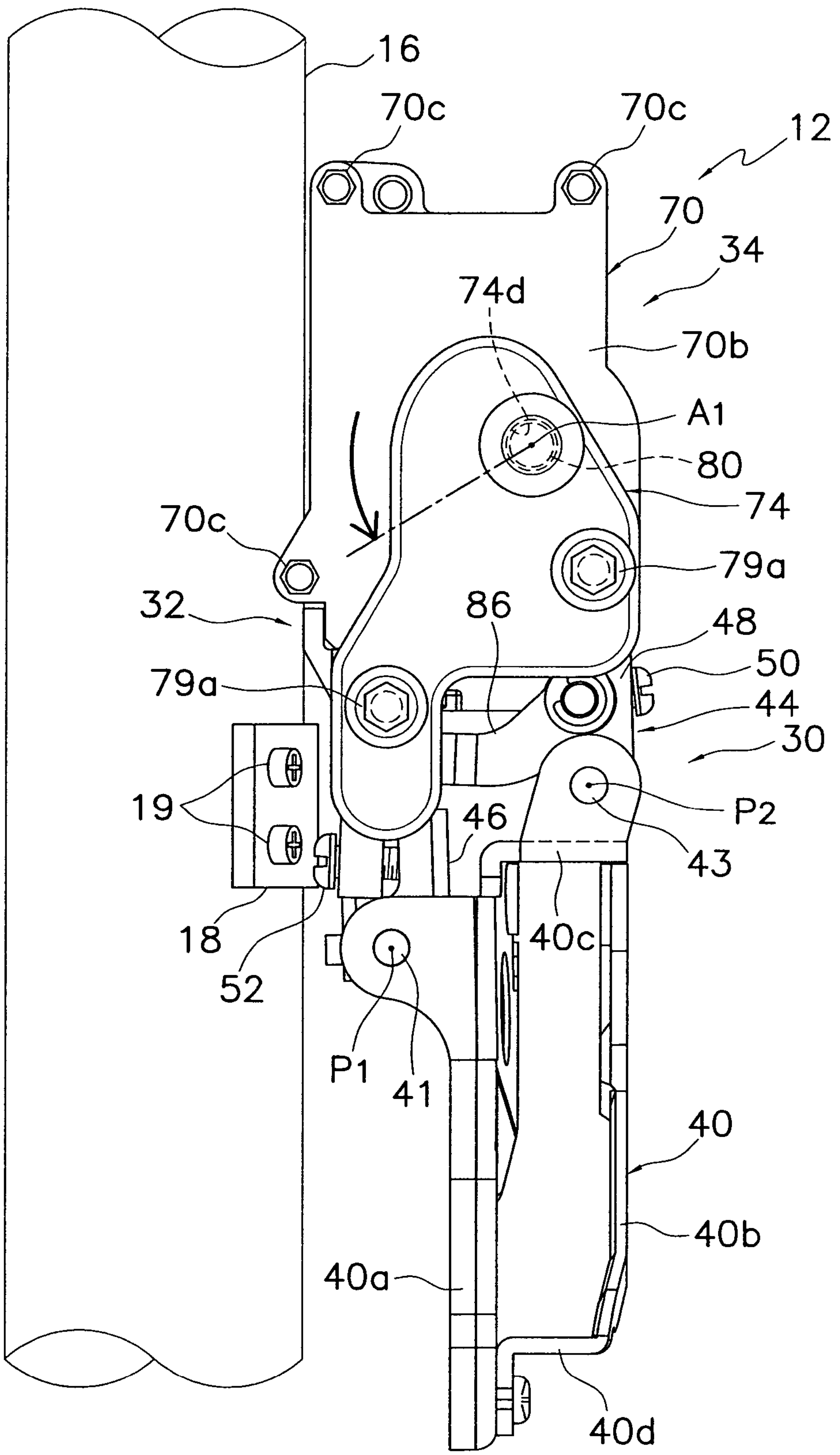
FIG. 4 is a rear elevational view of the motorized front derailleur assembly illustrated in FIGS. 2 and 3 with the chain guide in the low position, and with the motor unit cover coupled thereto.
Figure 5:
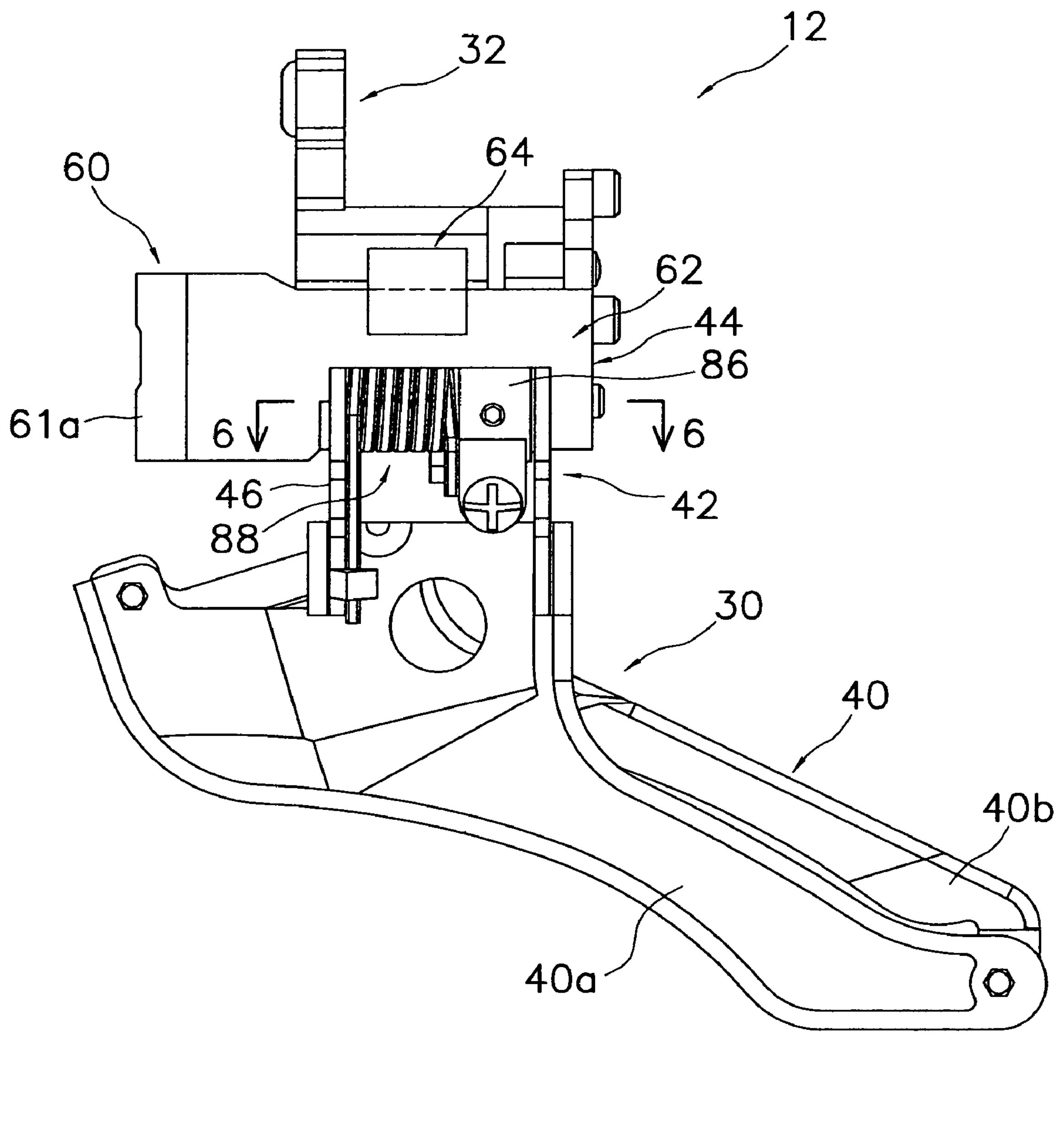
FIG. 5 is an inner side elevational view of the motorized front derailleurs assembly illustrated in FIGS. 2-4, with the motor unit and portions of the motor linkage removed for the purpose of illustration.
Figure 6:
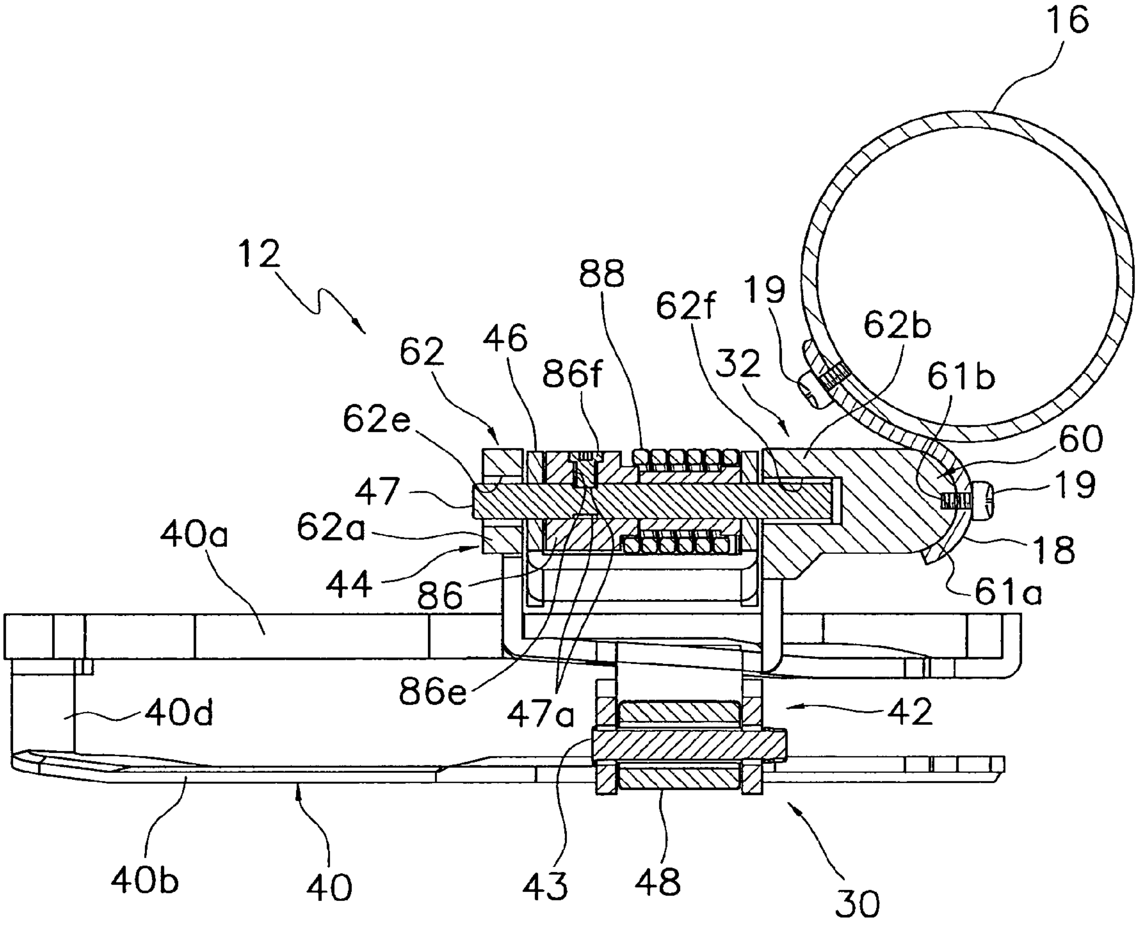
FIG. 6 is a partial cross-sectional view of the motorized front derailleur assembly illustrated in FIGS. 2-5, as seen along section line 6-6 of FIG. 5.

Referring initially to FIGS. 1-4, a bicycle 10 is illustrated that is equipped with a motorized bicycle front derailleur assembly 12 in accordance with a first embodiment of the present invention. The bicycle 10 includes a bicycle frame 14 having a seat tube 16 with the motorized front derailleur assembly 12 mounted to the seat tube 16 by a bracket 18 and a plurality of fasteners or bolts 19, as best seen in FIGS. 2-4. The front derailleur assembly 12 is actuated/operated in a conventional manner by an electronic shifting unit 20 coupled to a front electrical shift control device 22*a* via an electric shift cable to move a chain 24 between at least two front sprockets or chain wheels 26 and 28.

The sprockets 26 and 28 are part of a bicycle drive train that includes a rear electrical shift control device 22*b* as well as various other conventional parts such as pedals, a crank set, one or more rear sprockets, a motorized rear derailleur, a freewheel and the chain 24. The electrical shift control device 22*a* is preferably provided with a pair of shift buttons (not shown) that are operatively coupled to the electronic shifting unit 20, preferably in accordance with U.S. Pat. No. 6,073,730 (assigned to Shimano, Inc.) and U.S. Pat. No. 6,682,087 (assigned to Shimano, Inc.). The electrical shift control device 22*a* is basically a mirror image of the shift control device 22*b*, and is located on the opposite side of the handlebar from the shift control device 22*b*. Thus, the shift control device 22*a* is located behind (i.e. is hidden behind) the shift control device 22*b* in FIG. 1.

Since the majority of the parts of the bicycle 10 are well known in the bicycle art, these parts will not be discussed or illustrated in detail herein, except as they are modified to be used in conjunction with the present invention. Moreover, various conventional bicycle parts, which are not illustrated and/or discussed herein, can also be used in conjunction with the present invention.

Referring now to FIGS. 2-13, the motorized front derailleur assembly 12 basically includes a motorized front derailleur unit 30, a motorized front derailleur mounting member 32, a front derailleur motor unit 34 and a motor linkage 36. The motorized front derailleur unit 30, the front derailleur motor unit 34 and the motor linkage 36 are all mounted on the motorized front derailleur mounting member 32. The motorized front derailleur mounting member 32 is configured and arranged to fixedly couple the motorized front derailleur assembly 12 to the seat tube 16 of the bicycle frame 14 via the bracket 18 and the fasteners 19.

Figure 9:
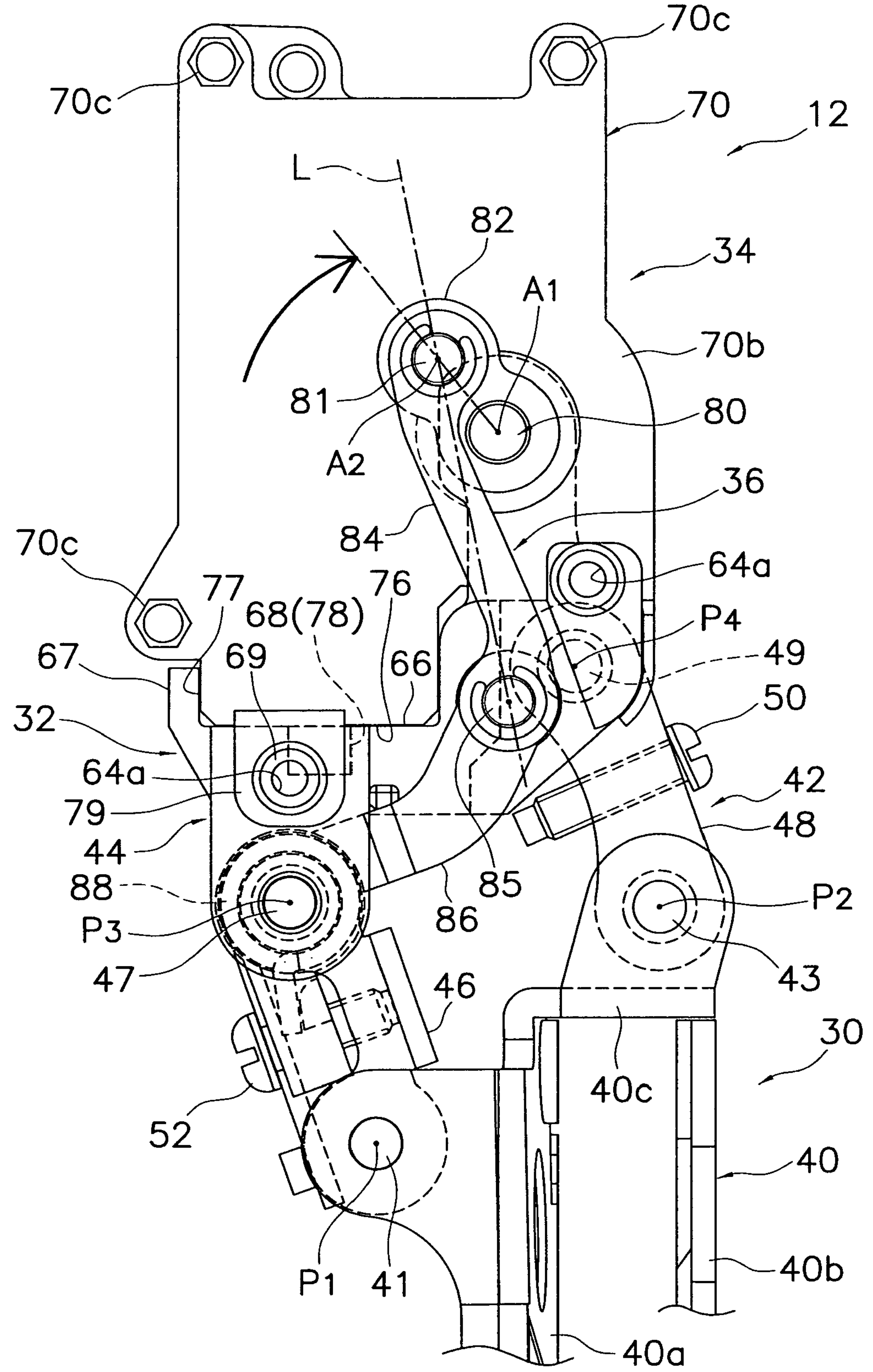
FIG. 9 is a further enlarged, rear elevational view of the motorized front derailleur assembly illustrated in FIG. 8 with the chain guide in the top position, and with the motor unit cover removed for the purpose of illustration.
Figure 10:
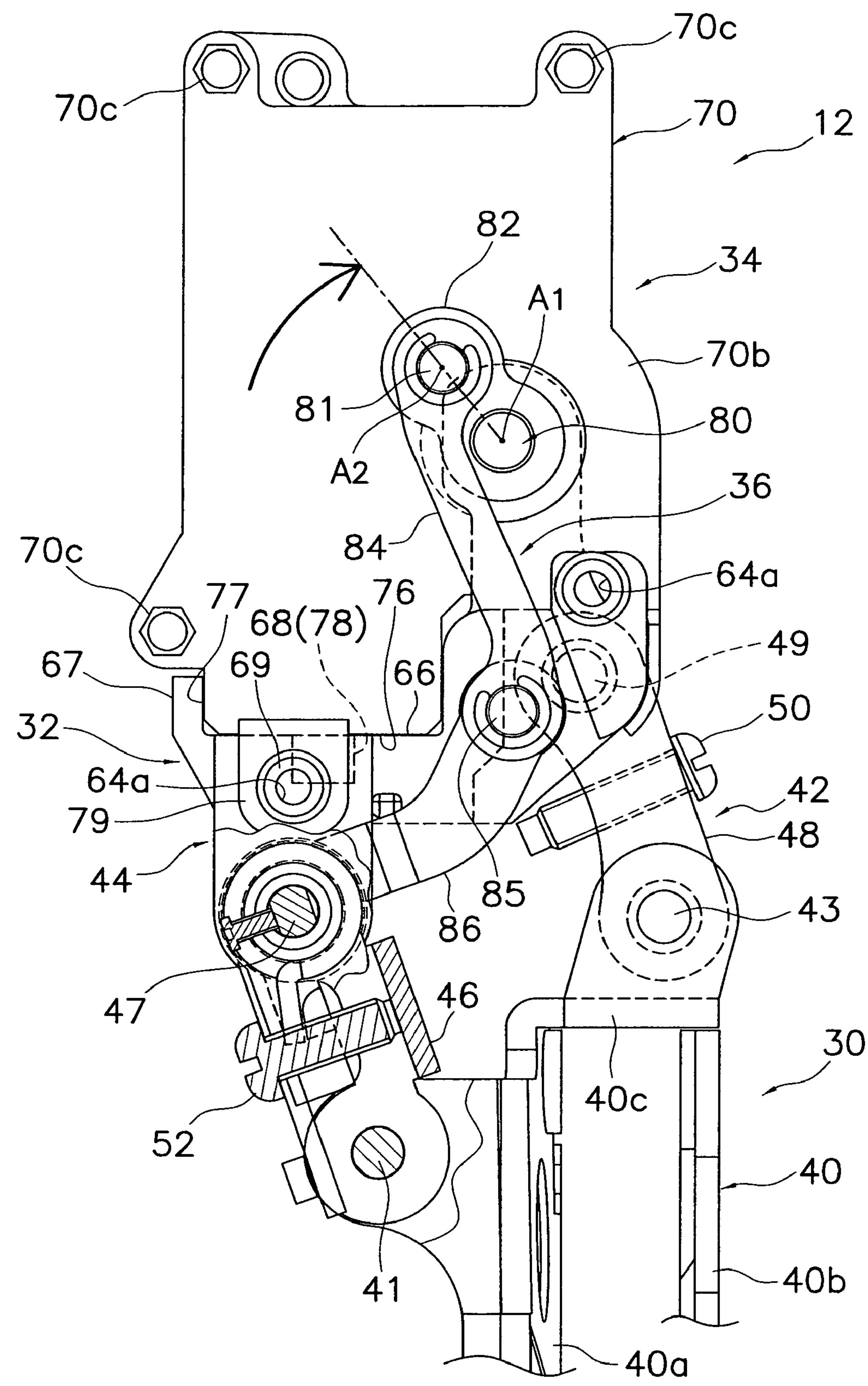
FIG. 10 is a rear elevational view of the portion of the motorized rear derailleur assembly illustrated in FIG. 9, with portions broken away and portions illustrated in cross-section for the purpose of illustration of the jamming protection connection.
Figure 11:
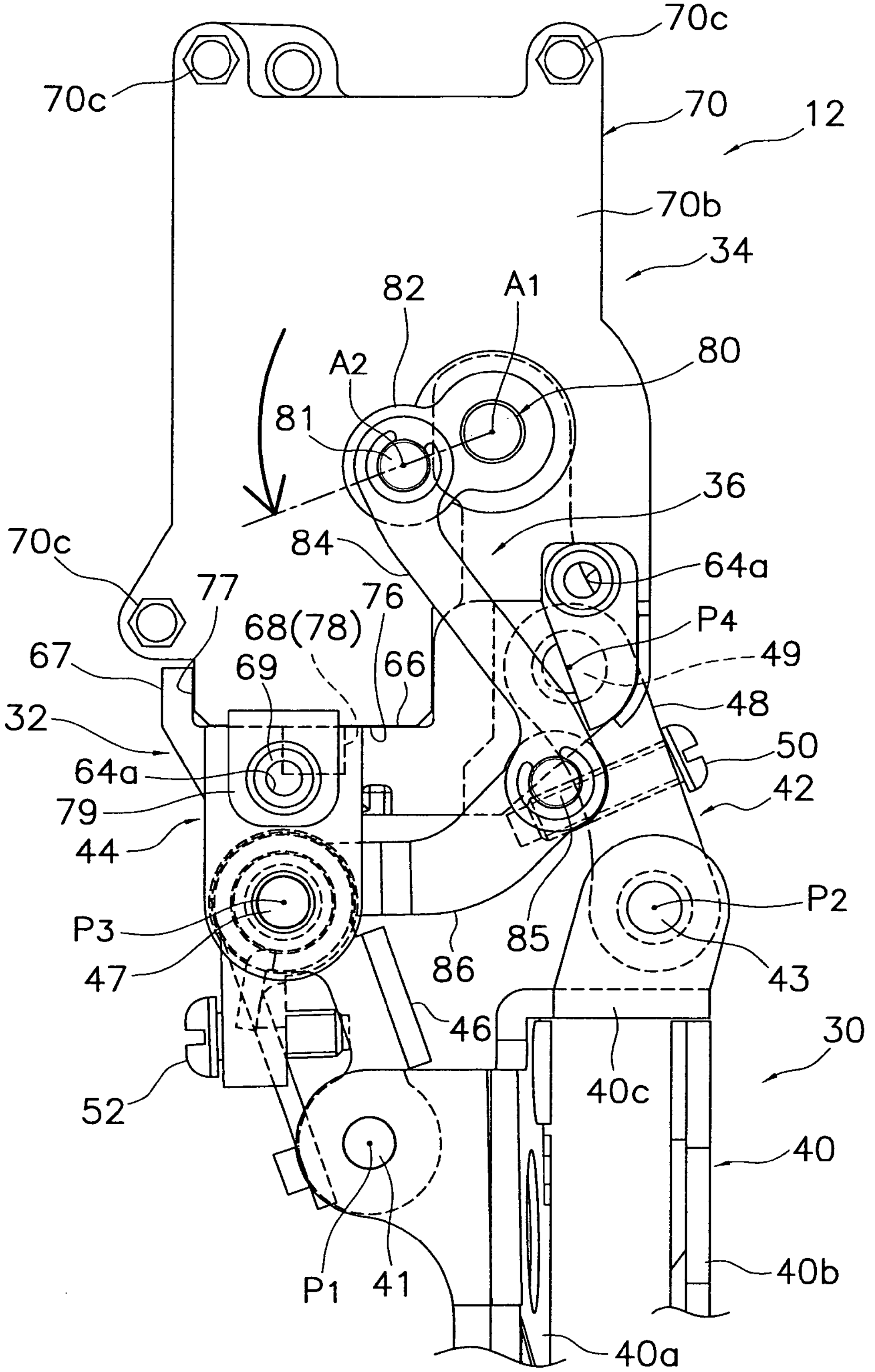
FIG. 11 is a partial, rear elevational view of the motorized front derailleur assembly illustrated in FIGS. 2-10 having the motor linkage moved into the low position/orientation and the derailleur linkage being held such that the chain guide remains in the top position (e.g. from a jam or the like)

As explained in more detail below, the motorized front derailleur assembly 12 is constructed to move between at least a low shift position as illustrated in FIGS. 2-7 and 12 and a top shift position as illustrated in FIGS. 8-10 and 13. Moreover, as illustrated in FIG. 11, the motor linkage 36 is designed with a derailleur protection arrangement (i.e. a jamming protection connection) such that the derailleur motor unit 34 can be operated even though the motorized front derailleur unit 30 does not move (e.g. becomes jammed). The basic operation of shifting the chain 24 is relatively conventional, and thus, will not be discussed and/or illustrated in detail herein.

As best seen in FIGS. 2-13, the front derailleur unit 30 basically includes a chain guide 40, a derailleur linkage 42 and a fixing body 44 that is part of the mounting member 32, as explained below. The derailleur linkage 42 together with the chain guide 40 and the fixing body 44 preferably form a four-bar linkage that controls the lateral movement of the chain guide 40. The derailleur linkage 42 is operatively coupled between the fixing body 44 and the chain guide 40 for lateral movement of the chain guide 40 relative to the fixing body 44 between at least a low shift position and a top shift position, i.e., at least first and second shift positions. More specifically, the chain guide 40 is movably coupled to the fixing body 44 by the derailleur linkage 42, which is operatively coupled to the motor linkage 36 to move the chain guide 40 between the first and second shift positions in response to operation of front derailleur motor unit 34. This lateral movement of the chain guide 40 causes the chain 24 to be shifted between the sprockets 26 and 28 of the bicycle drive train 24.

The chain guide 40 is preferably constructed of a hard rigid material. For example, the chain guide 40 is preferably constructed of a metal material such as a rigid sheet metal that is bent to the desired shape. As best seen in FIGS. 3, 4, 7, 9 and 11, the chain guide 40 has inner and outer (first and second) shifted pivot points $P_1$ and $P_2$, respectively, for pivotally securing the derailleur linkage 42 to the chain guide 40. In particular, pivot pins 41 and 43 pivotally couple the chain guide 40 to the derailleur linkage 42. The chain guide 40 has a chain receiving slot that is formed by a pair of (inner and outer) vertical shift plates 40*a* and 40*b*. The vertical shift plates 40*a* and 40*b* are adapted to engage the chain 24, and thus, to move the chain 24 in a direction substantially transverse to the bicycle 10. The shift plates 40*a* and 40*b* are connected together by a pair of plates 40*c* and 40*d*, i.e. upper and lower plates 40*c* and 40*d*. The upper plate 40*c* is integrally formed with the inner shift plate 40*a*. The lower plate 40*d* has one end that is integrally formed with the outer shift plate 40*b* and the other end that is attached to the inner shift plate 40*a* via a fastener, such as a screw or rivet. The upper ends of the shift plates 40*a* and 40*b* are further coupled together by a pair of additional fasteners, such as a screws or rivets with bushings mounted between the plates 40*a* and 40*b* in a conventional manner.

Referring now to FIGS. 2-17 and 33-40, the derailleur linkage 42 basically includes an inner link 46 and an outer link 48 with first or upper ends pivotally coupled to the fixing body 44 and second or lower ends pivotally coupled to the chain guide 40. Specifically, the inner link 46 has a first inner link end 46*a* pivotally coupled to a fixed inner (first) pivot point $P_3$ of the fixing body 44 by a pivot pin 47 and a second inner link end 46*b* pivotally coupled to the shifted inner pivot point $P_1$ of the chain guide 40 by the pivot pin 41. Similarly, the outer link 48 has a first outer link end 48*a* pivotally coupled to a fixed outer (second) pivot point $P_4$ of the fixing body 44 by a pivot pin 49 and a second outer link end 48*b* pivotally coupled to the shifted outer pivot point $P_2$ of the chain guide 40 by the pivot pin 43.

As apparent from the discussion above, the derailleur linkage 42 is preferably a four-bar linkage that is formed by the inner link 46, the outer link 48, the portion of the chain guide 40 extending between the inner and outer shifted pivot points $P_1$ and $P_2$, and the portion of the fixing body 44 extending between the inner and outer fixed pivot points $P_3$ and $P_4$. Thus, the pivot axes of the pivot points $P_1$, $P_2$, $P_3$ and $P_4$ are all substantially parallel to each other.

When the derailleur linkage 42 holds the chain guide 40 in its extended position, the chain guide 40 is located over the outermost sprocket 26, i.e., the furthest sprocket from the seat tube 16. When the derailleur linkage 42 holds the chain guide 40 in its retracted position, the chain guide 40 is located over the innermost sprocket 28, i.e., the closet sprocket to the seat tube 16. These movements of the chain guide 40 and the derailleur linkage 42 are controlled by the electronic shifting unit 20, as explained below.

Figure 16:
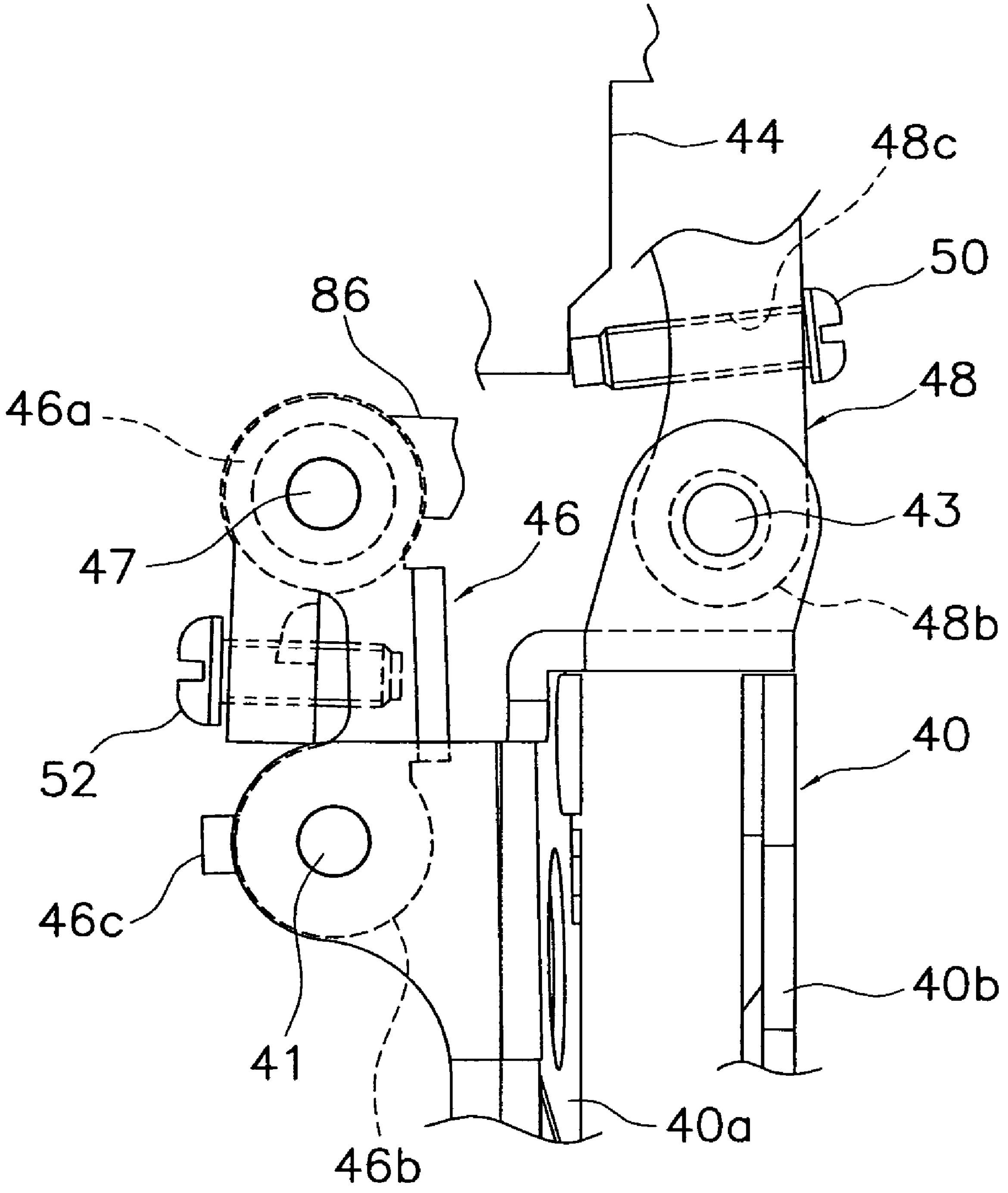
FIG. 16 is an enlarged, partial rear elevational (diagrammatic) view of the mechanical adjustment device of the motorized front derailleur assembly illustrated in FIGS. 2-13, with the chain guide in the low position.
Figure 17:
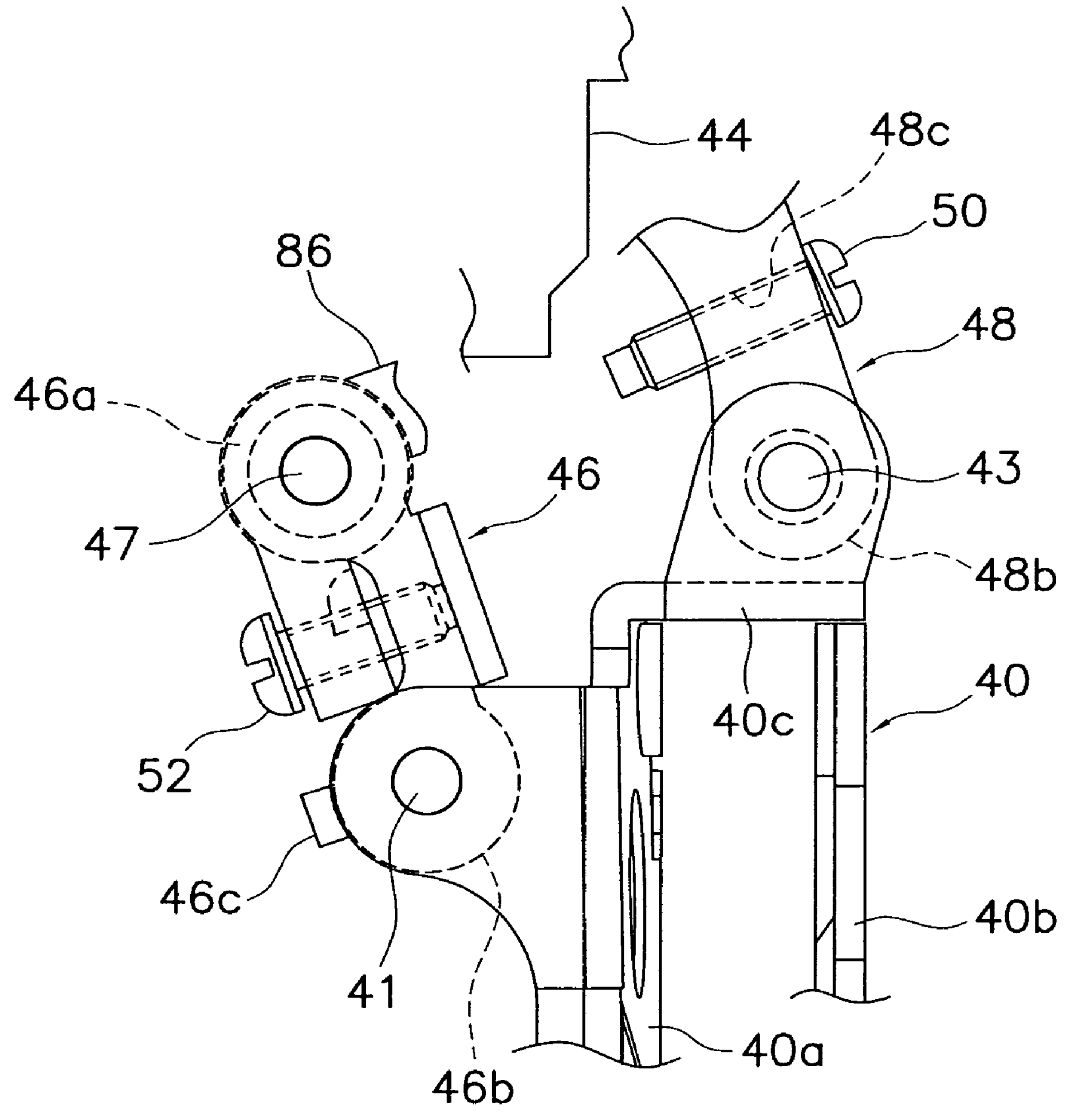
FIG. 17 is an enlarged, partial rear elevational (diagrammatic) view of the mechanical adjustment device of the motorized front derailleur assembly illustrated in FIGS. 2-13, with the chain guide in the top position.
Figure 18:
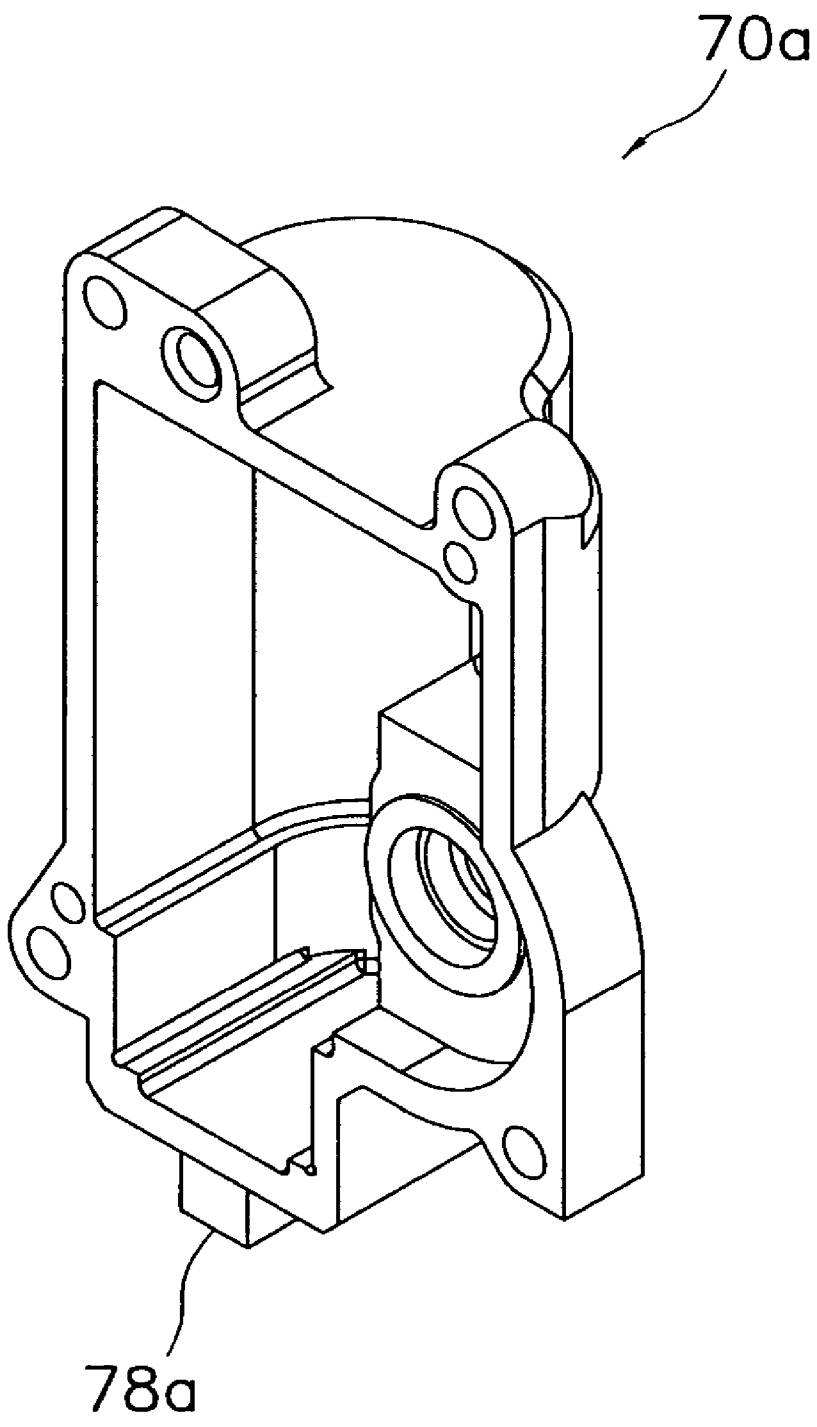
FIG. 18 is an enlarged rear perspective view of the a first housing part of the motor unit housing of the motorized front derailleur assembly illustrated in FIGS. 2-13.
Figure 19:
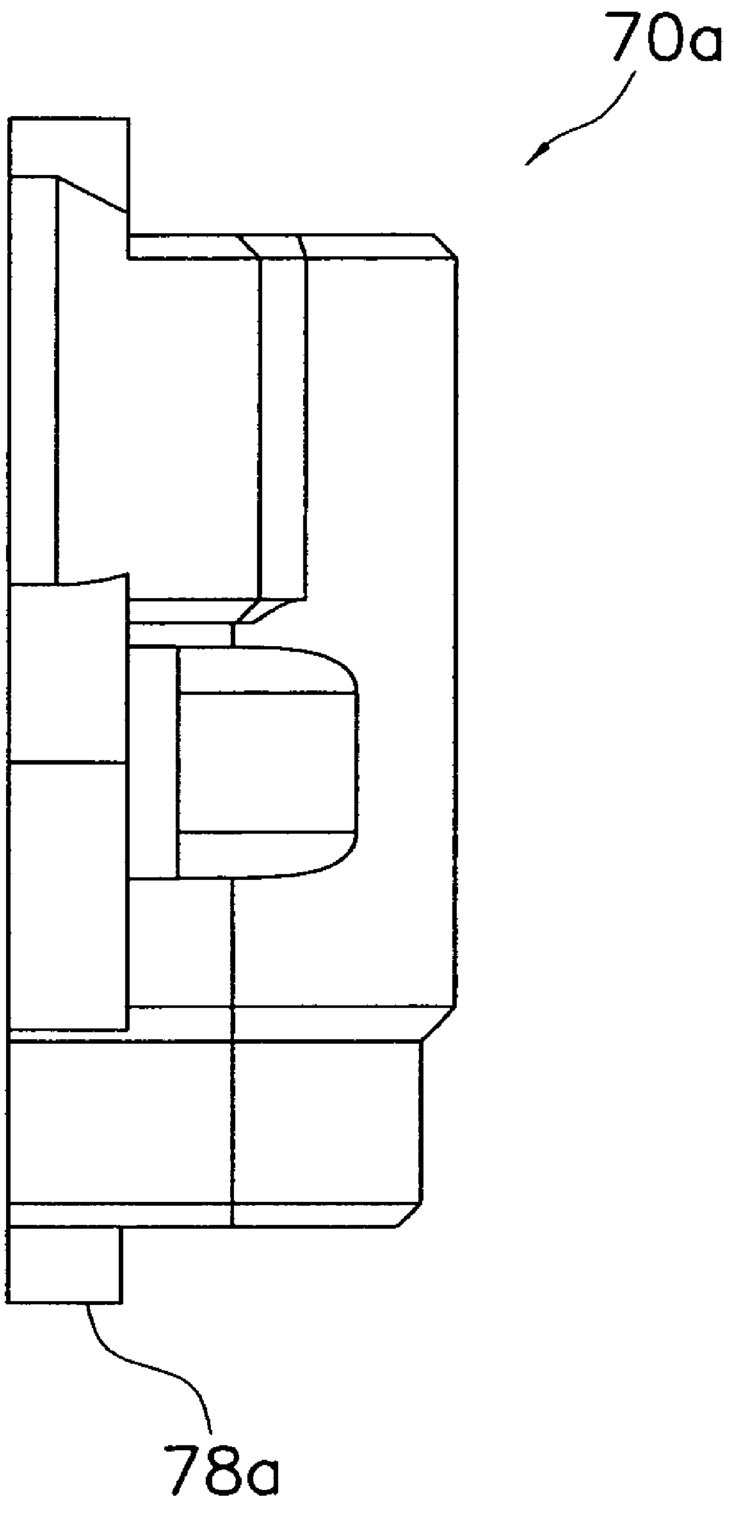
FIG. 19 is an outer side elevational view of the first housing part illustrated in FIG. 18.
Figure 20:
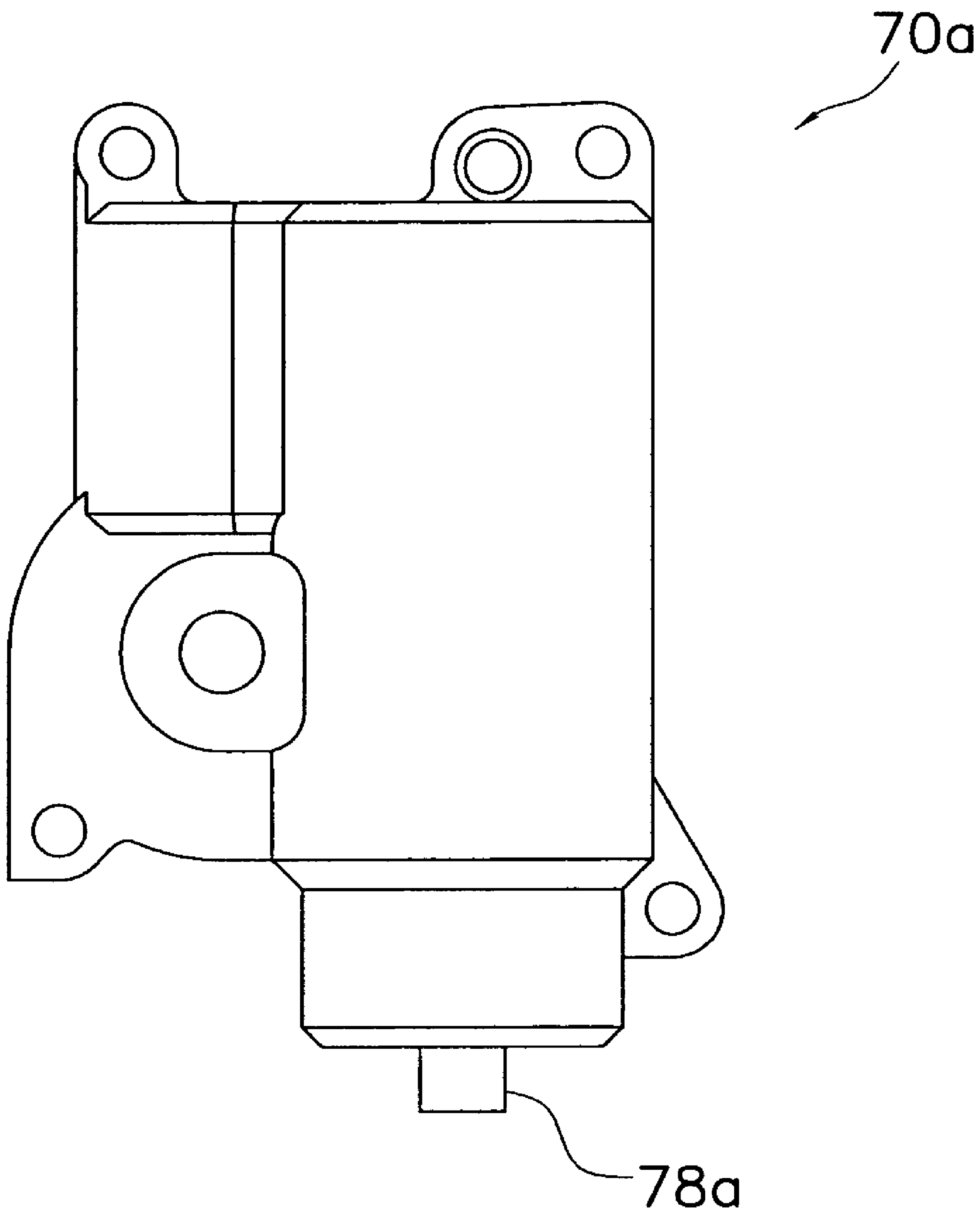
FIG. 20 is a front elevational view of the first housing part illustrated in FIGS. 18 and 19.
Figure 21:
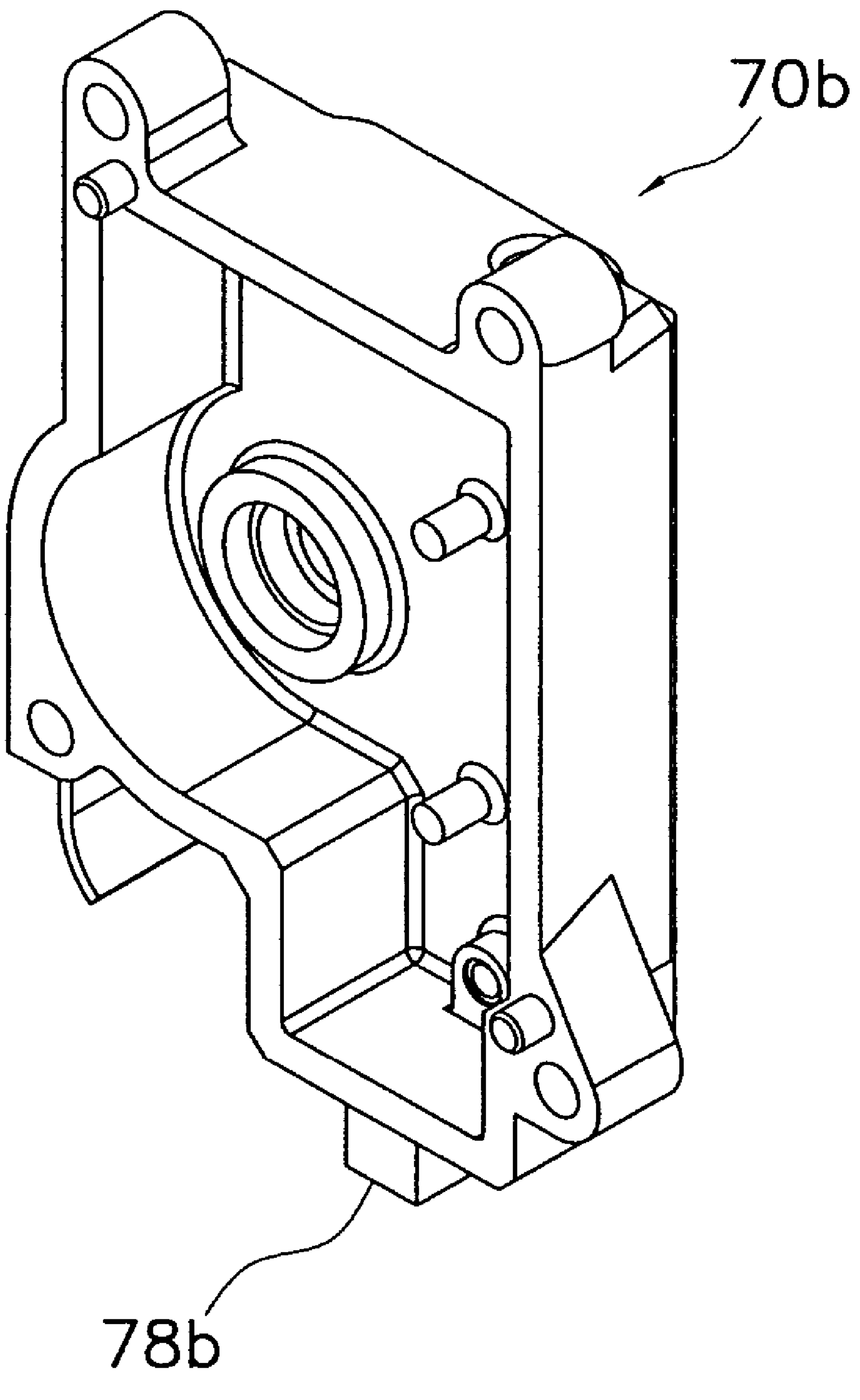
FIG. 21 is an enlarged front perspective view of the a second housing part of the motor unit housing of the motorized front derailleur assembly illustrated in FIGS. 2-13.
Figure 22:
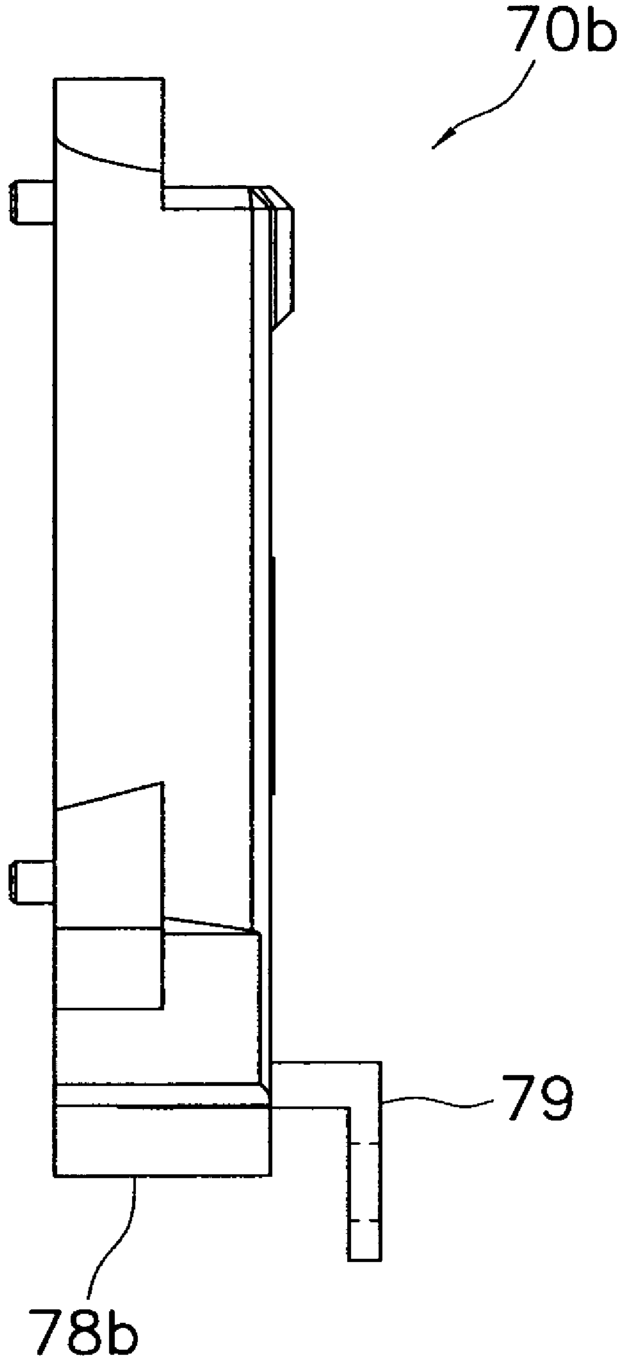
FIG. 22 is an inner side elevational view of the second housing part illustrated in FIG. 21.
Figure 23:
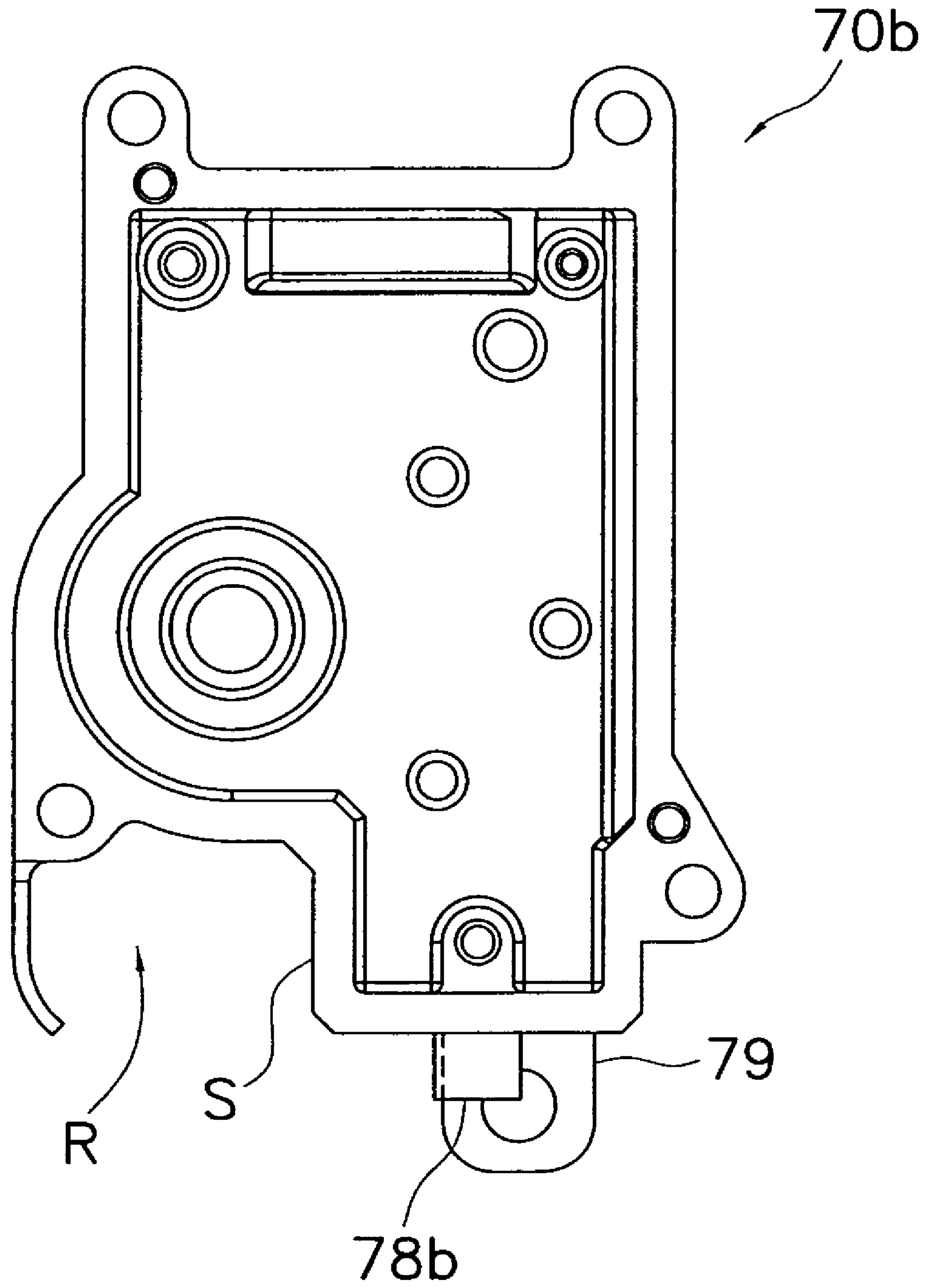
FIG. 23 is a front elevational view of the second housing part illustrated in FIGS. 21 and 22.
Figure 24:
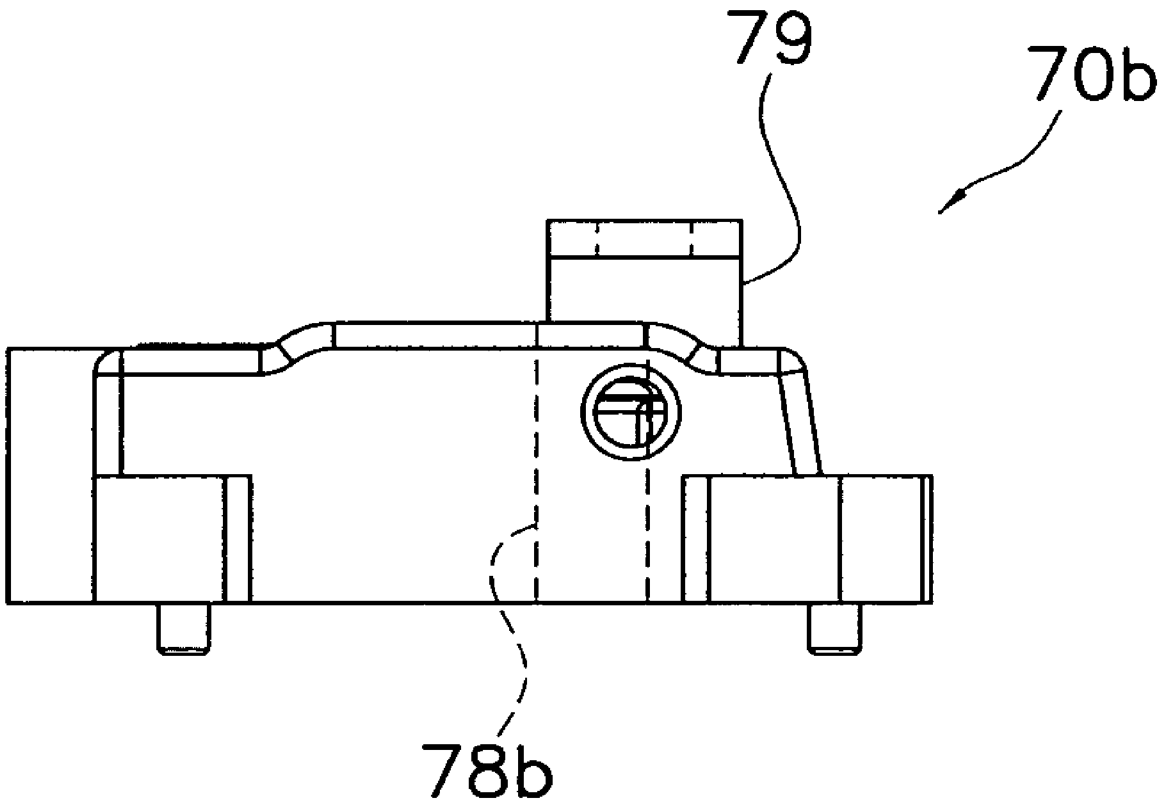
FIG. 24 is a top plan view of the second housing part illustrated in FIGS. 21-23.
Figure 25:
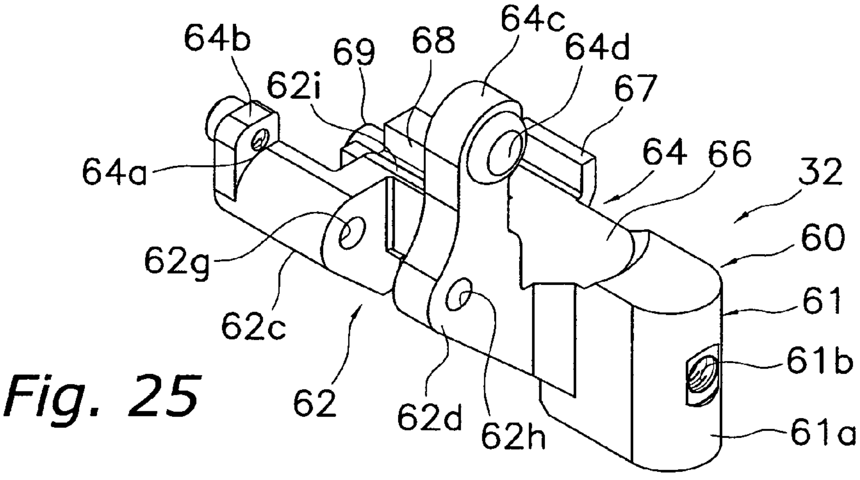
FIG. 25 is an enlarged front perspective view of the motorized front derailleur mounting member of the motorized front derailleur assembly illustrated in FIGS. 2-13.
Figure 26:
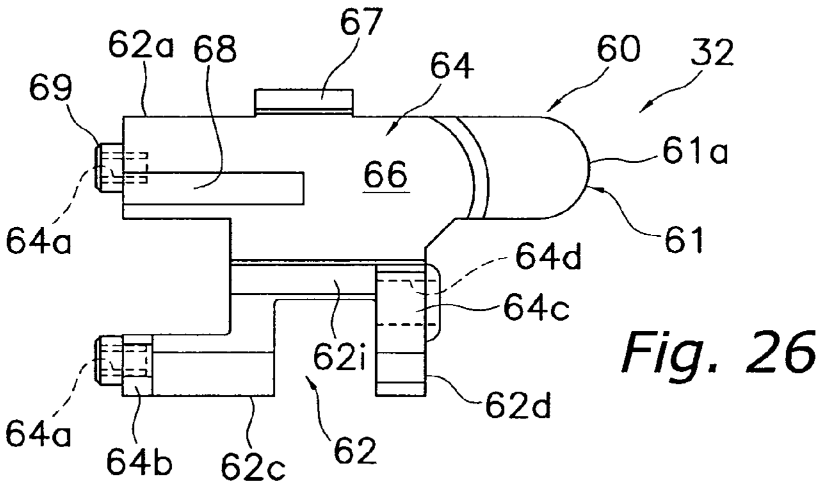
FIG. 26 is a top plan view of the motorized front derailleur mounting member illustrated in FIG. 25.
Figure 27:
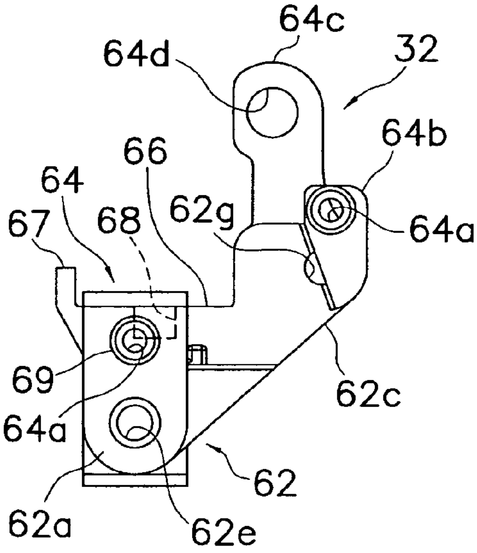
FIG. 27 is a rear elevational view of the motorized front derailleur mounting member illustrated in FIGS. 25 and 26.
Figure 28:
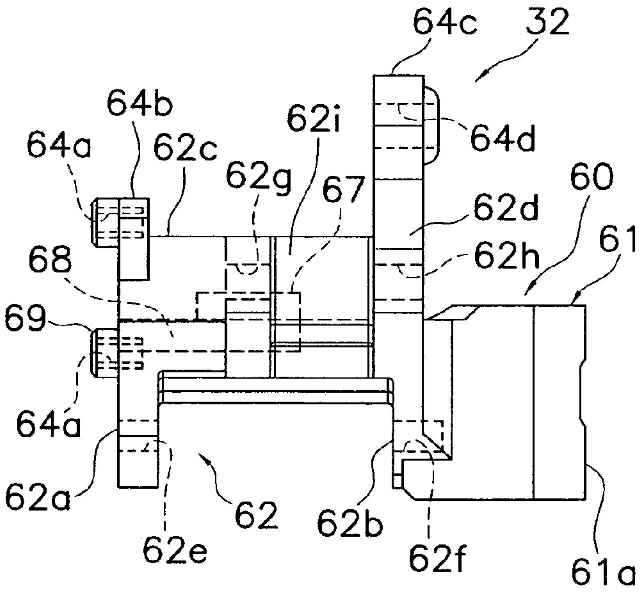
FIG. 28 is an outer side elevational view of the motorized front derailleur mounting member illustrated in FIGS. 25-27.
Figure 29:
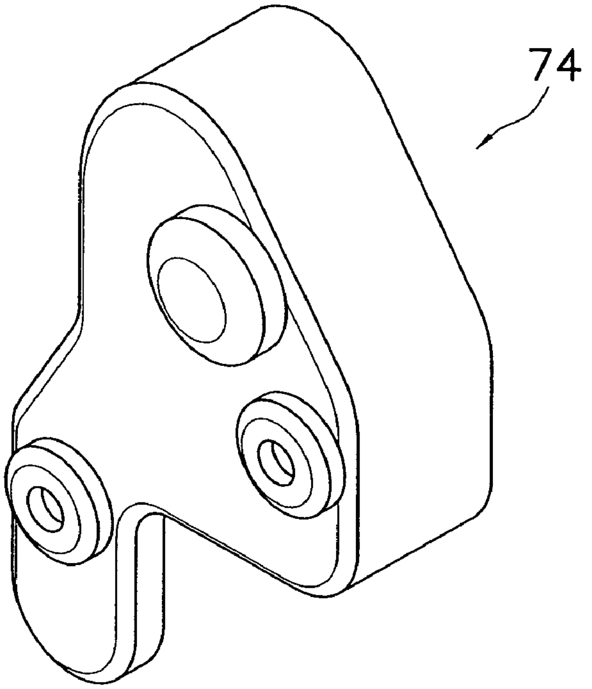
FIG. 29 is an enlarged rear perspective view of the motor unit cover (i.e. a secondary motor unit mounting portion) of the motorized front derailleur assembly illustrated in FIGS. 2-13.
Figure 30:
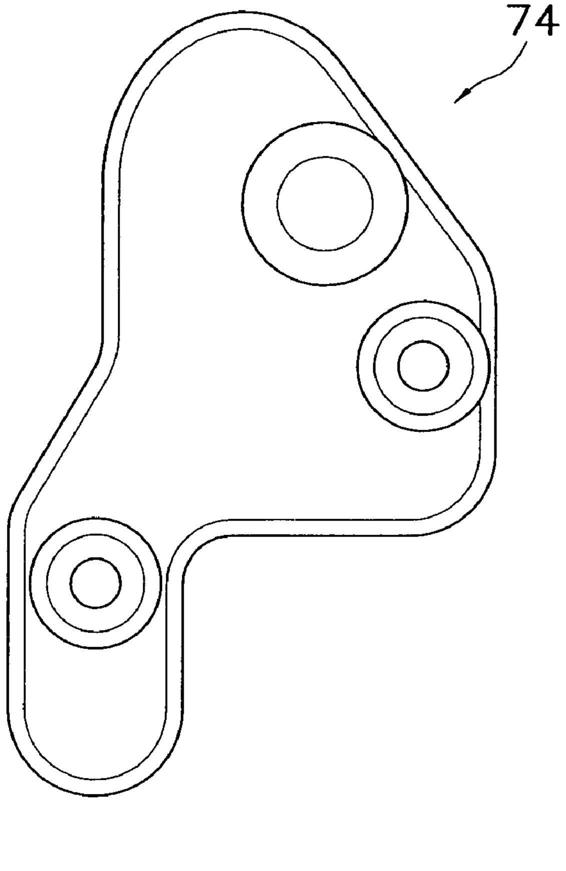
FIG. 30 is a rear elevational view of the motor unit cover illustrated in FIG. 29.
Figure 31:
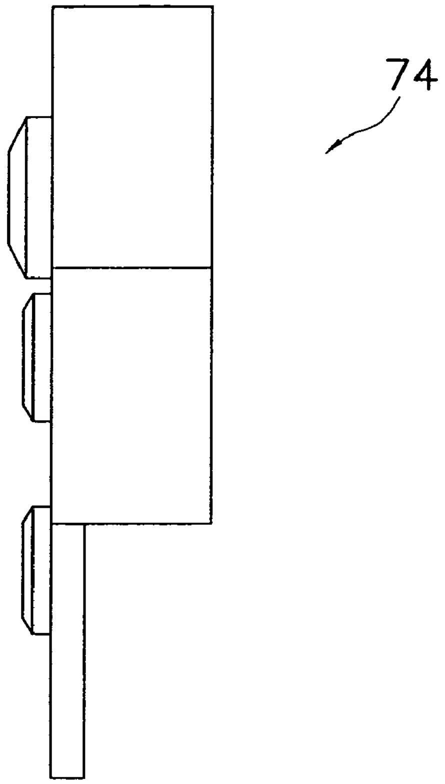
FIG. 31 is an outer side elevational view of the motor unit cover illustrated in FIGS. 29 and 30.
Figure 32:
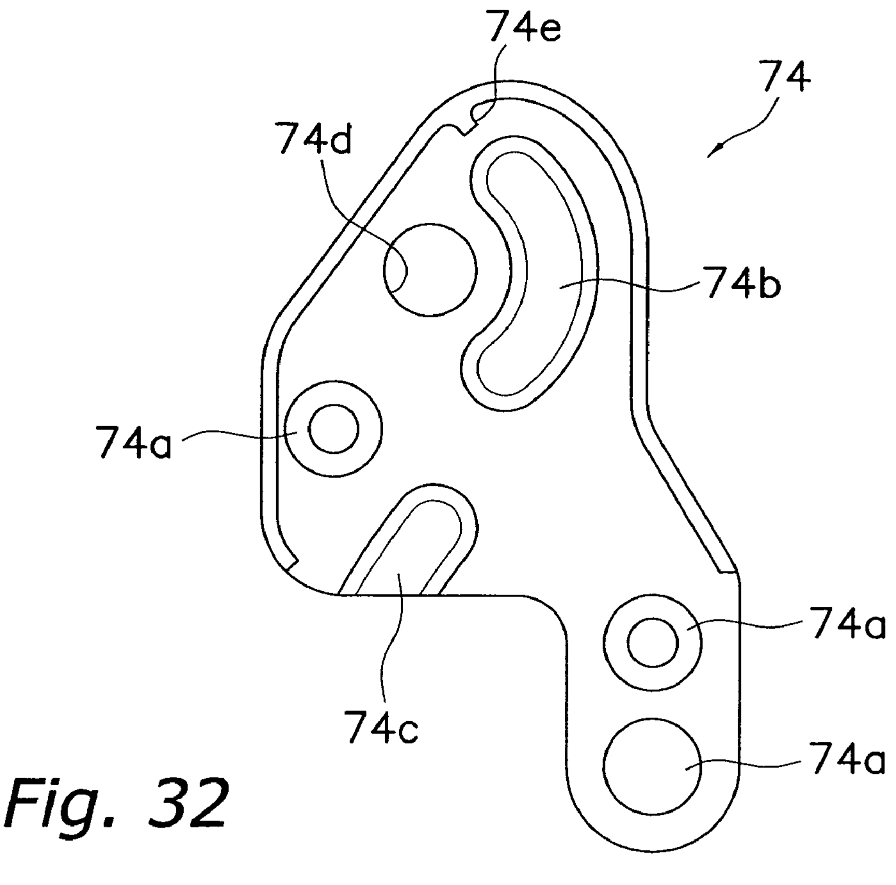
FIG. 32 is a front elevational view of the motor unit cover illustrated in FIGS. 29-31.
Figure 33:
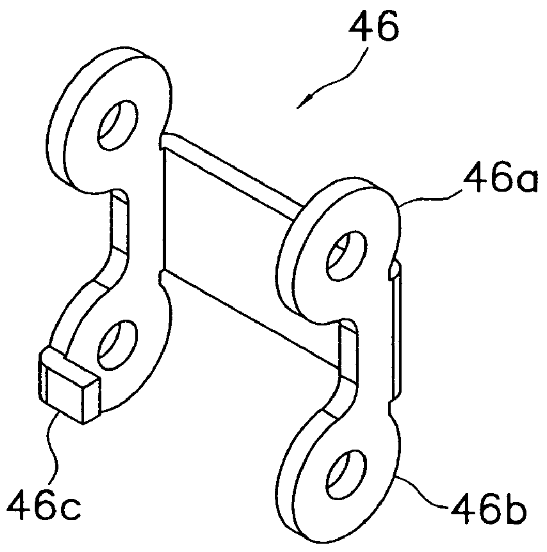
FIG. 33 is an enlarged rear perspective view of the inner link of the motorized front derailleur assembly illustrated in FIGS. 2-13.
Figure 34:
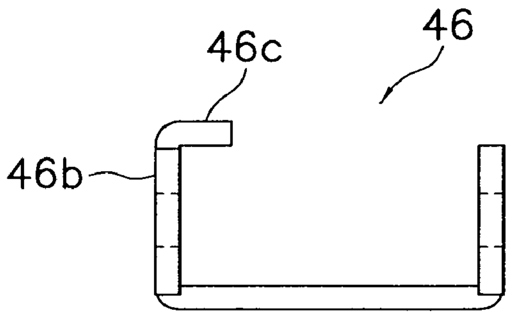
FIG. 34 is a bottom plan view of the inner link illustrated in FIG. 33.
Figure 35:
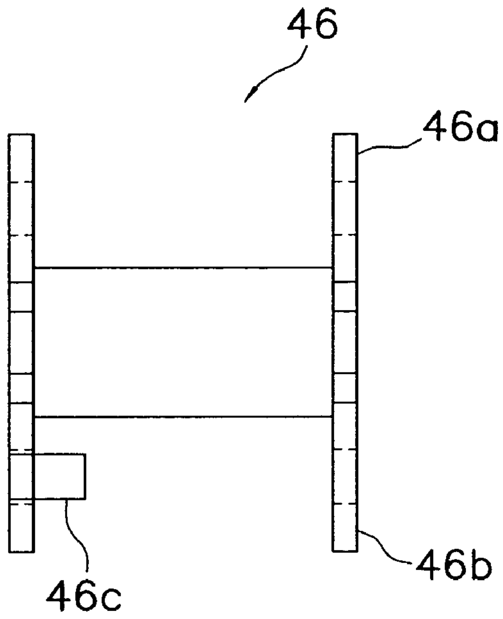
FIG. 35 is an inner side elevational view of the inner link illustrated in FIGS. 33 and 34.
Figure 36:
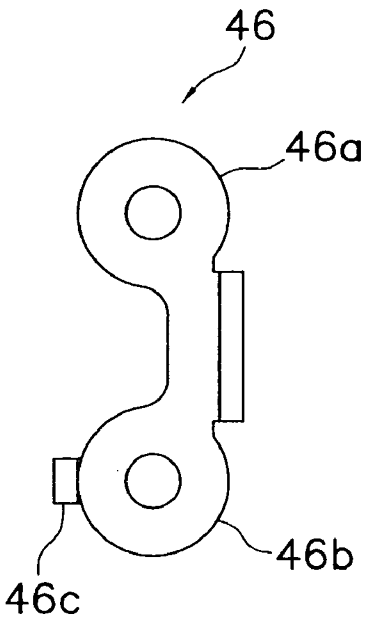
FIG. 36 is a rear elevational view of the inner link illustrated in FIGS. 33-35.
Figure 37:
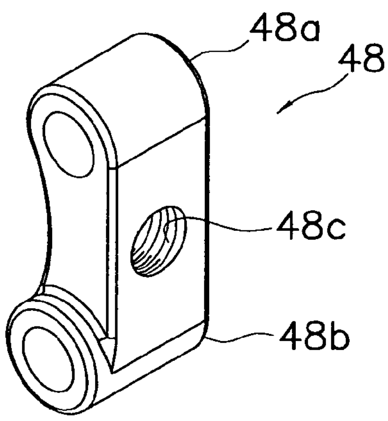
FIG. 37 is an enlarged rear perspective view of the outer link of the motorized front derailleur assembly illustrated in FIGS. 2-13.
Figure 38:
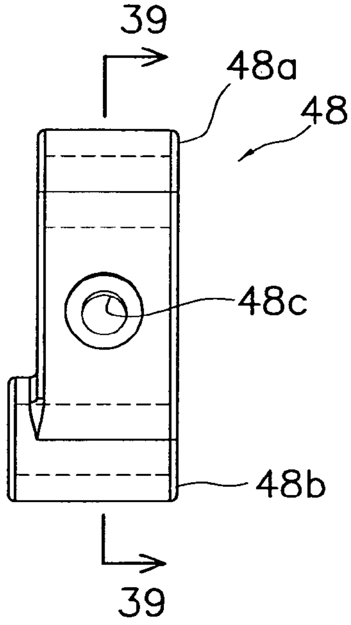
FIG. 38 is an outer side elevational view of the outer link illustrated in FIG. 37.
Figure 39:
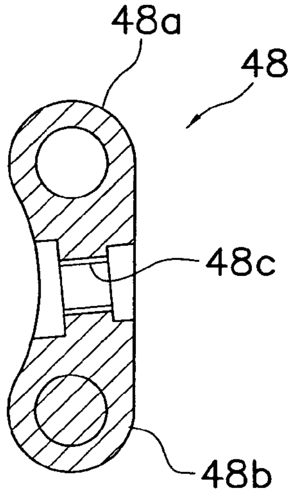
FIG. 39 is a cross-sectional view of the outer link illustrated in FIGS. 37 and 38, as seen along section line 39-39 of FIG. 38.
Figure 40:
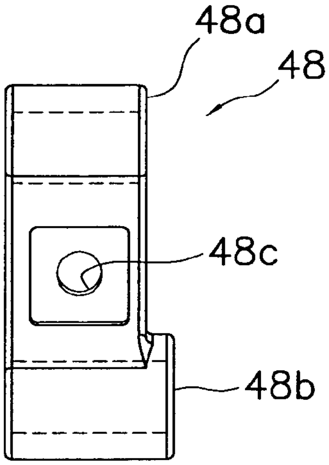
FIG. 40 is an inner side elevational view of the outer link illustrated in FIGS. 37-39.
Figure 41:
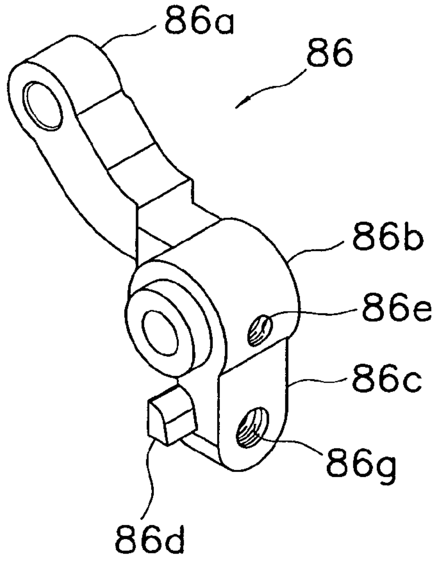
FIG. 41 is an enlarged front perspective view of the saver link of the motorized front derailleur assembly illustrated in FIGS. 2-13.
Figure 42:
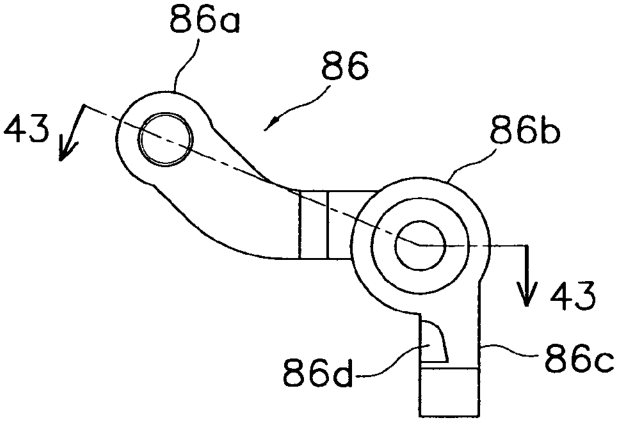
FIG. 42 is a front elevational view of the saver link illustrated in FIG. 41.
Figure 43:
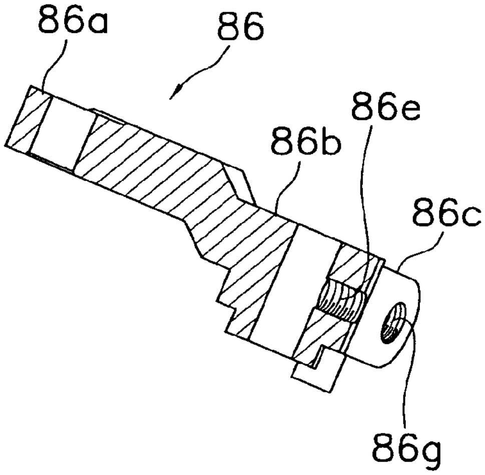
FIG. 43 is a cross-sectional view of the saver link illustrated in FIGS. 41 and 42, as seen along section line 43-43 of FIG. 42.
Figure 44:
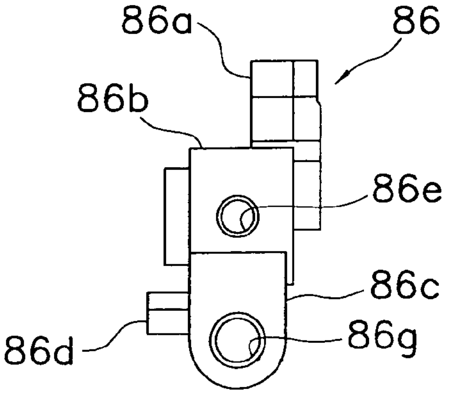
FIG. 44 is an inner side elevational view of the saver link illustrated in FIGS. 41-43.

Referring mainly to FIGS. 16 and 17, the outer link 48 includes a threaded hole 48*c* that receive a low position adjustment screw 50. In particular, the low adjustment screw 50 is arranged and configured to such that the free end selectively contacts the fixing body 44 to selectively limit the amount of laterally inward movement of the chain guide 40. Thus, the threaded hole 48*c* of the outer link 48, the low adjustment screw 50 and the fixing body 44 form a part of a mechanical adjustment device that finely adjusts the low position of the chain guide 40.

Depending on the position of the low adjustment screw 50 relative to the outer link 48 the free end of the low adjustment screw 50 may not contact the fixing body 44 (e.g. no adjustment if the low adjustment screw 50 is unscrewed a predetermined amount) when the chain guide 40 is moved from the top position to the low position. However, preferably the free end of the low adjustment screw 50 will selectively contact the fixing body 44 (e.g. if the low adjustment screw 50 is screwed a predetermined amount through the outer link 48) when the chain guide 40 is moved from the top position to the low position, as illustrated herein. In other words, once the low adjustment screw 50 is screwed a predetermined amount through the outer link 48, the free end of the low adjustment screw 50 will contact the fixing body 44 when the chain guide 40 is moved from the top position to the low position to limit inward movement of the chain guide 40. The contact point can be gradually changed/adjusted when the low adjustment screw 50 is gradually screwed further through the outer link 48.

A top adjustment screw 52 is threadedly coupled to the motor linkage 36 to contact the inner link 46 in order to finely adjust the top position of the chain guide 40. The adjustment of the top position of the chain guide 40 will be discussed in more detail below. The top adjustment screw 52 and the portions of the inner link 46 and the motor linkage 36 form a part of the mechanical adjustment device that finely adjusts the top position of the chain guide 40. The top adjustment screw 52 is a first adjustment screw, while the low adjustment screw 50 is a second adjustment screw.

Thus, the mechanical adjustment device is configured and arranged to change the first and second shift positions (e.g. the low and top positions) of the chain guide 40 relative to the fixing body 44. In other words, the low adjustment screw 50 is configured and arranged to change the low shift position of the chain guide 40 relative to the fixing body 44, while the top adjustment screw 52 is configured and arranged to change the top shift position of the chain guide 40 relative to the fixing body 44. While the adjustment screws 50 and 52 are preferably mounted on the outer link 48 and the motor linkage 36, respectively, it will be apparent to those skilled in the art from this disclosure that the adjustment screws 50 and 52 could be mounted on any one of the fixing body 44, the chain guide 40, the motor linkage 36 and the links 46 and 48 with a free end of the respective adjustment screw contacting any one of the fixing body 44, the chain guide 40, the motor linkage 36 and the links 46 and 48 to which the adjustment screw is not threadedly coupled.

Figure 7:
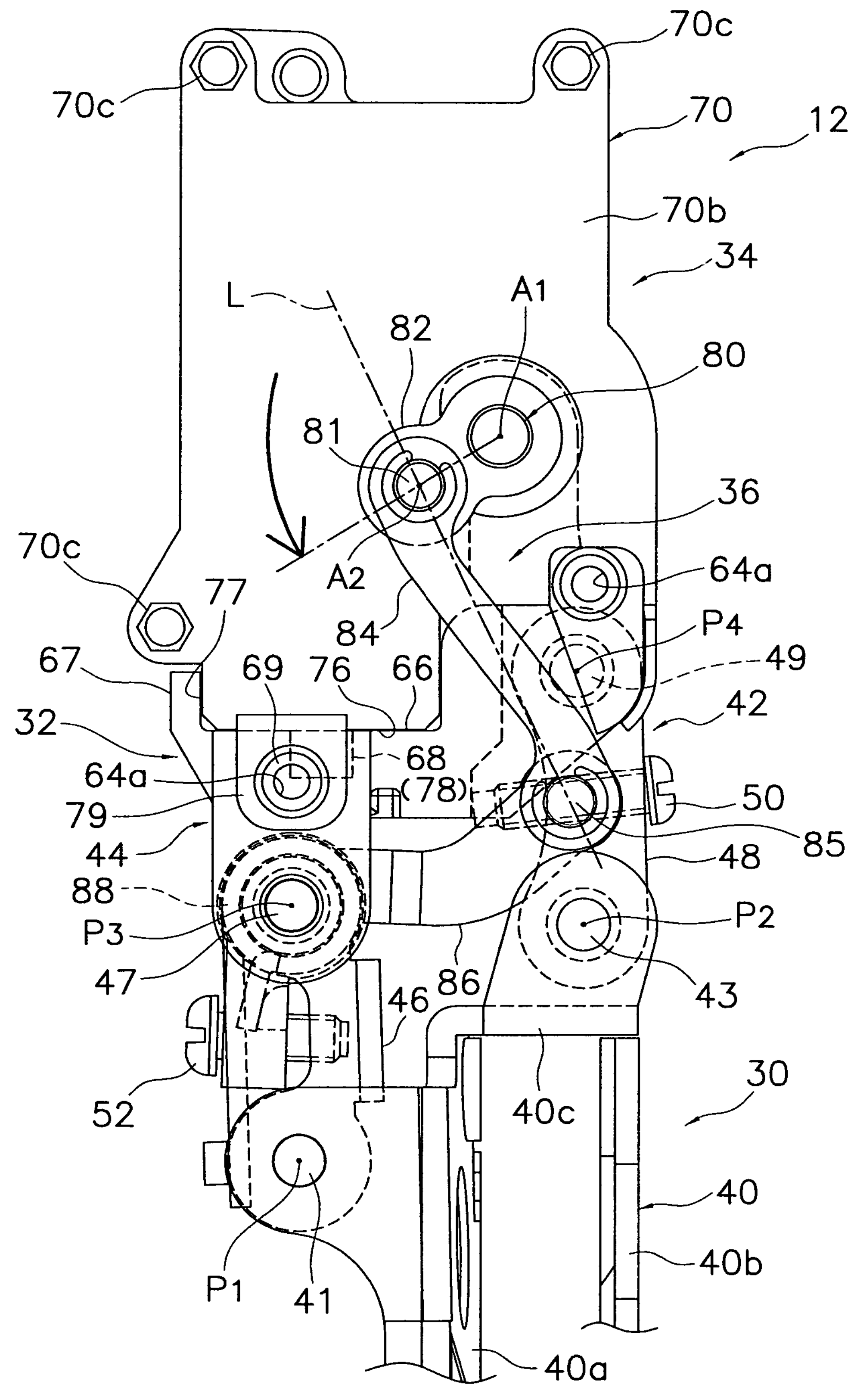
FIG. 7 is a further enlarged, partial rear elevational view of the motorized front derailleur assembly illustrated in FIGS. 2-4 with the chain guide in the low position, and with the motor unit cover removed for the purpose of illustration.
Figure 8:
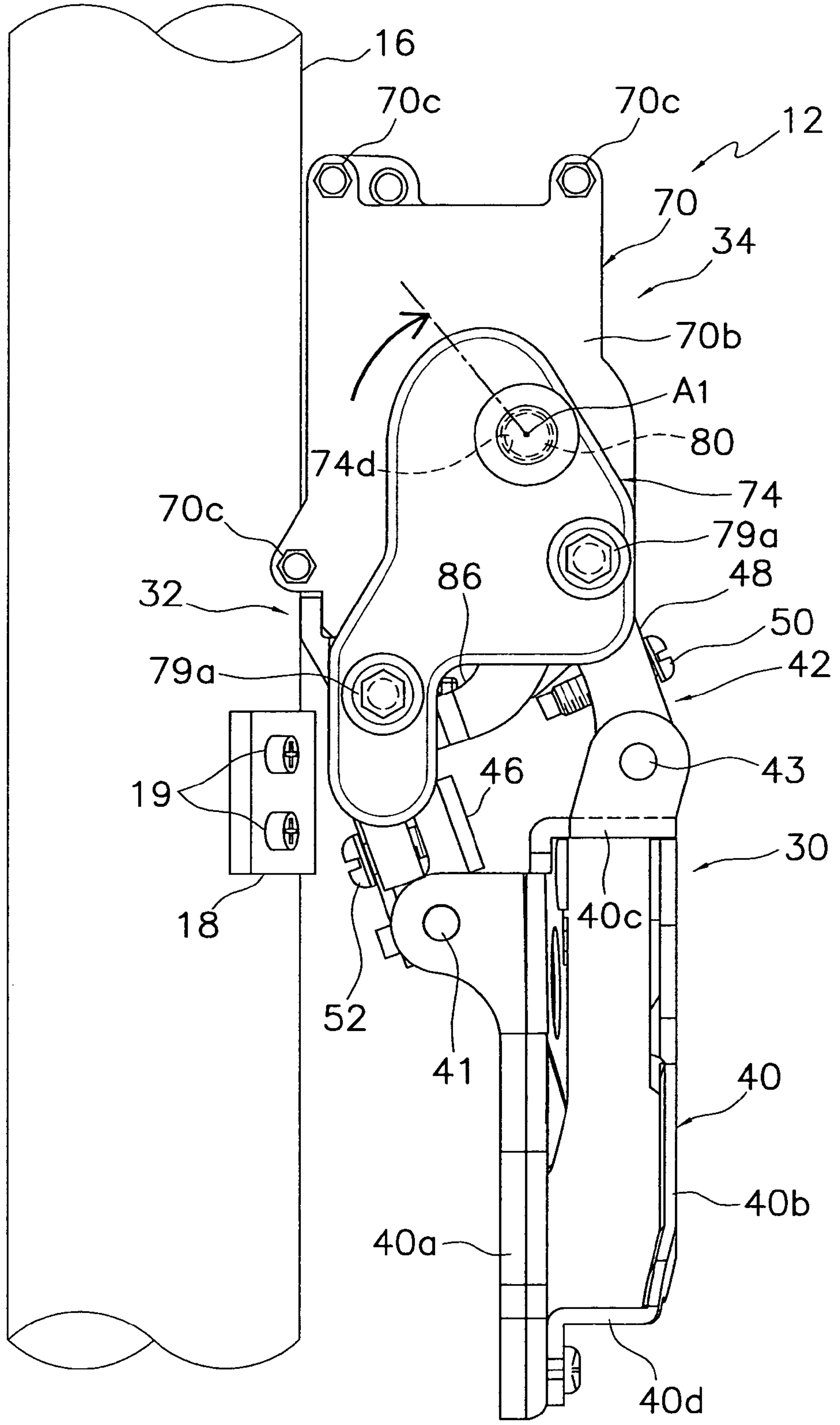
FIG. 8 is a rear elevational view of the motorized front derailleur assembly illustrated in FIGS. 2-4 with the chain guide in the top position.

In the illustrated embodiment, the top adjustment screw 52 is configured and arranged to also change the low shift position of the chain guide 40 relative to the fixing body 44 when adjusted, if the low adjustment screw 50 is not rotated far enough to contact the fixing body 44 when the chain guide is moved from the top position to the low position. However, typically, during normal use the low adjustment screw 50 will be configured to contact the fixing body 44 to limit inward movement of the inner and outer links 46 and 48 such that the top adjustment screw 52 moves out of contact with the inner link 46 when the chain guide 40 is shifted from the top position to the low position as seen in FIGS. 7 and 16. In other words, the top adjustment screw 52 is not designed to normally adjust the low position. In particular, the stroke of the motor unit 34 is configured to move the chain guide 40 over a larger range than the lateral spacing between the sprockets 26 and 28 such that the adjustment screws 50 and 52 are used to finely adjust the range of movement of the chain guide 40, as explained below in more detail. Each of the adjustment screws 50 and 52 is also preferably threaded through a plastic washer member (not shown) to prevent accidental loosening thereof.

Referring now to FIGS. 2-13 and 25-28, the motorized front derailleur mounting member 32 basically includes a bicycle frame mounting portion 60, a front derailleur mounting portion 62 and a main motor unit mounting portion 64. The bicycle frame mounting portion 60, the front derailleur mounting portion 62 and the main motor unit mounting portion 64 are preferably integrally formed together as a one-piece, unitary member from a lightweight rigid material by casting, machining or the like in a conventional manner. Preferably, the front derailleur mounting member 32 is constructed of a metallic material such as an aluminum alloy, titanium or the like. The front derailleur mounting portion 62 and the main motor unit mounting portion 64 form a derailleur motor support structure.

The bicycle frame mounting portion 60 is configured and arranged to be coupled to the seat tube 16 of the bicycle frame 14 by the bracket 18 using the fasteners 19. The bicycle frame mounting portion 60 includes a projection 61 that projects outwardly from a first (front) side of the motorized front derailleur mounting member 32 to a free end that forms a curved front surface 61*a* with a threaded hole 61*b*. The curved front surface 61*a* is configured and arranged to contact a corresponding curved portion of the bracket 18 such that the motorized front derailleur mounting member 32 can not be rotated relative to the bracket 18. One of the fasteners or bolts 19 is received through a hole of the bracket 18 and threaded into the threaded hole 61*b* of the bicycle frame mounting portion 60, while the other two fasteners or bolts 19 are received through two other holes of the bracket 18 and threaded into the threaded holes (only one shown in FIG. 6) formed in the seat tube 16 such that the motorized front derailleur mounting member 32 is secured to the bicycle frame 14 via the bracket 18.

The front derailleur mounting portion 62 is configured and arranged to be coupled to the derailleur linkage 42 of the front derailleur unit 30. In particular, the front derailleur mounting portion 62 has first and second inner link supporting parts 62*a* and 62*b* that are configured and arranged to define an inner link receiving space therebetween for receiving the inner link 46, and first and second outer link support parts 62*c* and 62*d* that are configured and arranged to define an outer link receiving space therebetween for receiving the outer link 48. Thus, the first and second inner link supporting parts 62*a* and 62*b* and the first and second outer link support parts 62*c* and 62*d* are configured and arranged to form the front derailleur fixing body 44. The first and second link supporting parts 62*a* and 62*b* include first and second inner pivot pin mounting holes 62*e* and 62*f*, while the first and second outer link support parts 62*c* and 62*d* include first and second outer pivot pin mounting holes 62*g* and 62*h*. The first fixed pivot point $P_3$ is centrally located in the first and second inner pivot pin mounting holes 62*e* and 62*f*, while the second fixed pivot point $P_4$ is centrally located in the first and second outer pivot pin mounting holes 62*g* and 62*h*. The first and second link supporting parts 62*a* and 62*b* are spaced differently than the first and second outer link support parts 62*c* and 62*d* to accommodate the different sizes of the inner and outer links 46 and 48. The second fixed pivot axis of the second fixed pivot point $P_4$ is substantially parallel to the first fixed pivot axis of the first fixed pivot point $P_3$. The first and second outer link support parts 62*c* and 62*d* extend from a connecting section 62*i*.

The main motor unit mounting portion 64 is configured and arranged to be coupled to the front derailleur motor unit 34. In particular, the main motor unit mounting portion 64 has a first fastener-less mating structure that includes a motor support surface 66, a holding tab 67, a first recess 68, a mating projection 69 and a first projection formed by the first outer link support part 62*c* and the connecting section 62*i*. The holding tab 67 extends upwardly relative to and is arranged adjacent to the motor support surface 66, while the first recess 68 extends downwardly from the motor support surface 66. The mating projection 69 extends in a direction parallel to the motor support surface 66 from an end surface of the main motor unit mounting portion 64 below the motor support surface 66. The first projection formed by the first outer link support part 62*c* and the connecting section 62*i* extends upwardly relative to and is arranged adjacent to the motor support surface 66 in a manner similar to the holding tab 67 (i.e. to form an additional holding tab opposed to the holding tab 67). In other words, the first projection formed by the first outer link support part 62*c* and the connecting section 62*i* is located on an opposite lateral side of the motor support surface 66 from the holding tab 67.

The main motor unit mounting portion 64 includes a plurality (two) of threaded holes 64*a* that form additional mounting parts of the main motor unit mounting portion 64, i.e., in addition to the first fastener-less mating structure. In particular, one of the threaded holes 64*a* extends through the mating projection 69 into the main motor unit mounting portion 64, while the other threaded hole 64*a* extends through an additional projection that extends rearwardly from an upwardly extending flange 64*b* of the main motor unit mounting portion 64. The upwardly extending flange 64*b* extends upwardly from the rear end of the first projection formed by the first outer link support part 62*c* and the connecting section 62*i*. The main motor unit mounting portion 64 also includes an output shaft support section 64*c* with a shaft support hole 64*d* formed therein. The output shaft support section 64*c* extends upwardly from the second outer link support part 62*d*. The shaft support hole 64*d* is configured such that it has a center axis that is substantially parallel to the pivot axes of the first and second fixed pivot points $P_3$ and $P_4$ of the front derailleur mounting portion 62. The shaft support hole 64*d* of the main motor unit mounting portion 64 is preferably a through hole that is completely surrounded by material of the main motor unit mounting portion 64 (i.e. enclosed around its periphery). A low friction bushing is preferably press-fitted into the shaft support hole 64*d*.

Referring now to FIGS. 2-4, 7-13, 18-24, 29-32, 51 and 52, the front derailleur motor unit 34 basically includes a motor unit casing or housing 70 and an internal motor structure 72. The internal motor structure 72 is mounted within the housing 70. The housing 70 of the front derailleur motor unit 34 is removably mounted to the main motor unit mounting portion 64. Then a motor unit cover 74 is coupled to the housing 70 and the main motor unit mounting portion 64, as explained below in more detail. The front derailleur motor unit 34 is operatively coupled the chain guide 40 by the motor linkage 36 and the derailleur linkage 42. Thus, operation of the front derailleur motor unit 34 by the shifting unit 20 causes the chain guide 40 to be shifted between the low and top shift positions.

More specifically, an output shaft 80 is rotatably mounted to within the housing 70 to project out of opposite ends of the housing 70, as explained below in more detail. The output shaft 80 is operatively coupled between the internal motor structure 72 and the motor linkage 36. The motor unit cover 74 supports one (rear) end of the output shaft 80, while the output shaft support section 64*c* supports the other (front) end of the output shaft 80 in the low friction bushing that is mounted within the shaft support hole 64*d*.

Preferably, the housing 70 includes a first housing part 70*a* and a second housing part 70*b* attached to the first housing part 70*a* to form an internal cavity for receiving and supporting the internal motor structure 72 therein, as best seen in FIGS. 18-24, 51 and 52. The first and second housing parts 70*a* and 70*b* are constructed as separate members from a lightweight rigid material such as plastic by casting and/or machining in a conventional manner. The two housing parts 70*a* and 70*b* are fixedly attached together via a plurality of (three) fasteners 70*c* such as screws and hex nuts. As mentioned above, the output shaft 80 extends through opposite ends of the housing 70 (i.e., through each of housing parts 70*a* and 70*b*).

As best seen in FIGS. 7, 9-13 and 18-24, 51 and 52, the housing 70 has a second fastener-less mating structure that includes a lower motor housing surface 76, an external holding surface 77, a second protrusion 78, a flange 79 with a mating hole and a second recess R. The second fastener-less mating structure is removably coupled to the first fastener-less mating structure of the main motor unit mounting portion 64 without the need for additional fasteners. In particular, the motor housing surface 76 is supported on the motor support surface 66, the holding tab 67 contacts the external holding surface 77, the second protrusion 78 is received in the first recess 68, the flange 79 with the mating hole receives the mating projection 69 and the second recess R receives the first protrusion formed by the first outer link support part 62*c* and the connecting section 62*i*. The housing 70 further includes another external surface S similar to the external surface 77 formed in the recess R that contacts the additional holding tab formed by the second outer link support part 62*d* and the connecting section 62*i*.

The second protrusion 78 has preferably a substantially rectangular configuration as viewed along the output shaft 80 and as viewed in side elevation. The second protrusion 78 is formed of a first protruding section 78*a* of the first housing part 70*a* and a second protruding section 78*b* of the second housing part 70*b*. The second protrusion 78 and the mating recess 68 are preferably elongated in a substantially parallel direction to the rotation axis of the output shaft 80, with the recess 68 being longer than the protrusion 78. In any case, the first and second fastener-less mating structures are configured and arranged to resist rotational movement of the motor unit housing 70 about the rotational axis of the output shaft 80 relative to the motorized front derailleur mounting member 32 due to a torque produced by rotation of the output shaft 80 relative to the motor unit housing 70.

Of course, it will be apparent to those skilled in the art from this disclosure that one or more of the components of the first and second fastener-less mating structures (e.g. the motor support surface 66, the holding tab 67, the first recess 68, the mating projection 69, the first projection formed by the first outer link support part 62*c* and the connecting section 62*i*, the external holding surface 77, the second protrusion 78, the flange 79 with a mating hole and the second recess R) may be omitted, modified, reversed and/or substituted for each other if needed and/or desired. In any case, the first and second fastener-less mating structures should be configured to resist rotational torque without additional fasteners being essential.

The motor unit cover 74 is a substantially cup-shaped member that basically includes a plurality (three) of recesses 74*a*, a curved eccentric pin support slot 74*b*, an additional pin support slot 74*c*, shaft support bore 74*d* and a stopper 74*e*, as best seen in FIGS. 29-32. The motor unit cover 74 is preferably constructed as a one-piece, unitary member from a rigid, lightweight material such as a metallic material by casting and/or machining in a conventional manner. The recesses 74*a* are designed to mate with the mating projection 79 and the other two similar projections of the main motor unit mounting portion 64. Two of the recesses 74*a* have holes formed therethrough for receiving a pair of fasteners 79*a*. The rear end of the output shaft 80 is received in the shaft support bore 74*d*. The shaft support bore 74*d* is preferably a blind bore that has a low coefficient of friction. Optionally, a low friction bushing can be mounted in the shaft support bore 74*d* to rotatably support the output shaft 80. The pin support slots 74*b* and 74*c* are configured to support parts of the motor linkage, as explained below. The stopper 74*e* is configured to selective contact a part of the motor linkage 36, as also explained below.

In any case, in view of the above structure, the output shaft 80 is preferably rotatably supported at opposite ends thereof. Because the motor unit cover 74 supports the output shaft 80, the motor unit cover 74 is a detachable output shaft support section. Thus, an overall motor unit mounting portion is formed that includes the main motor unit mounting portion 64 and the motor unit cover 74. Accordingly, the overall motor unit mounting portion includes a pair of spaced output shaft support sections (e.g. the section 64*c* and the cover 74) that rotatably support opposite ends of the output shaft 80, with at least one of the output shaft support sections (i.e. the motor unit cover 74) being removably attached to the motorized front derailleur mounting member 32.

The internal motor structure 72 of front derailleur motor unit 34 is mounted within the housing 70. The internal motor structure 72 preferably includes a reversible electric motor that is powered by a battery source or a generator, a drive train including a plurality of gears operatively coupled between the electric motor and the output shaft 80, and a position control device that includes various electronic components (e.g. printed circuit board, photo interrupter, top-low brush sensor, etc.) for controlling operation of the electric motor. The internal motor structure 72 is electrically coupled to the shifting unit 20 by an electrical cord and to a power source (battery source or generator) by another electrical cord. Internal motor structures such as the internal motor structure 72 are well known. Thus, the internal motor structure 72 will not be discussed or illustrated in detail. Rather, the internal motor structure 72 can be understood from the second embodiment U.S. patent application Ser. No. 10/787,897, filed on Feb. 27, 2004 and assigned to Shimano, Inc.

Of course, it will be apparent to those skilled in the art from this disclosure that minor modifications to the internal motor structure from the second embodiment U.S. patent application Ser. No. 10/787,897 may be required such that it can be supported within the shape of the housing 70. However, such modifications are well within the level of ordinary skill in the art. Accordingly, these structures will not be discussed and/or illustrated in detail herein, except as needed to make and use the present invention, as defined in the appended claims.

Figure 12:
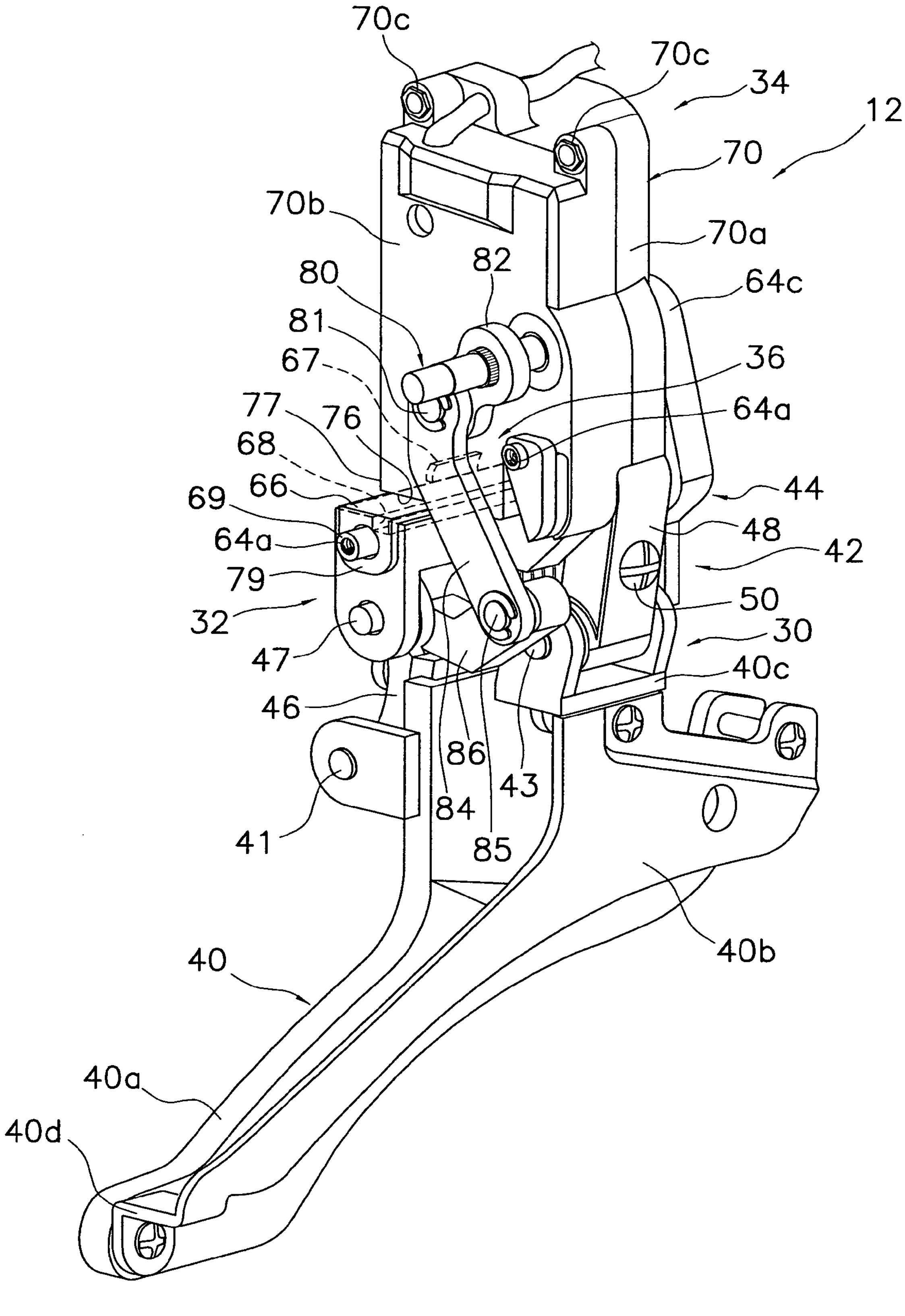
FIG. 12 is a rear, perspective view of the motorized front derailleur assembly illustrated in FIGS. 2-11, with the chain guide in the low position and with the motor unit cover removed for the purpose of illustration, and with portions illustrated as simplified shapes (e.g. the drive link and the saver link) for the purpose of illustration.
Figure 13:
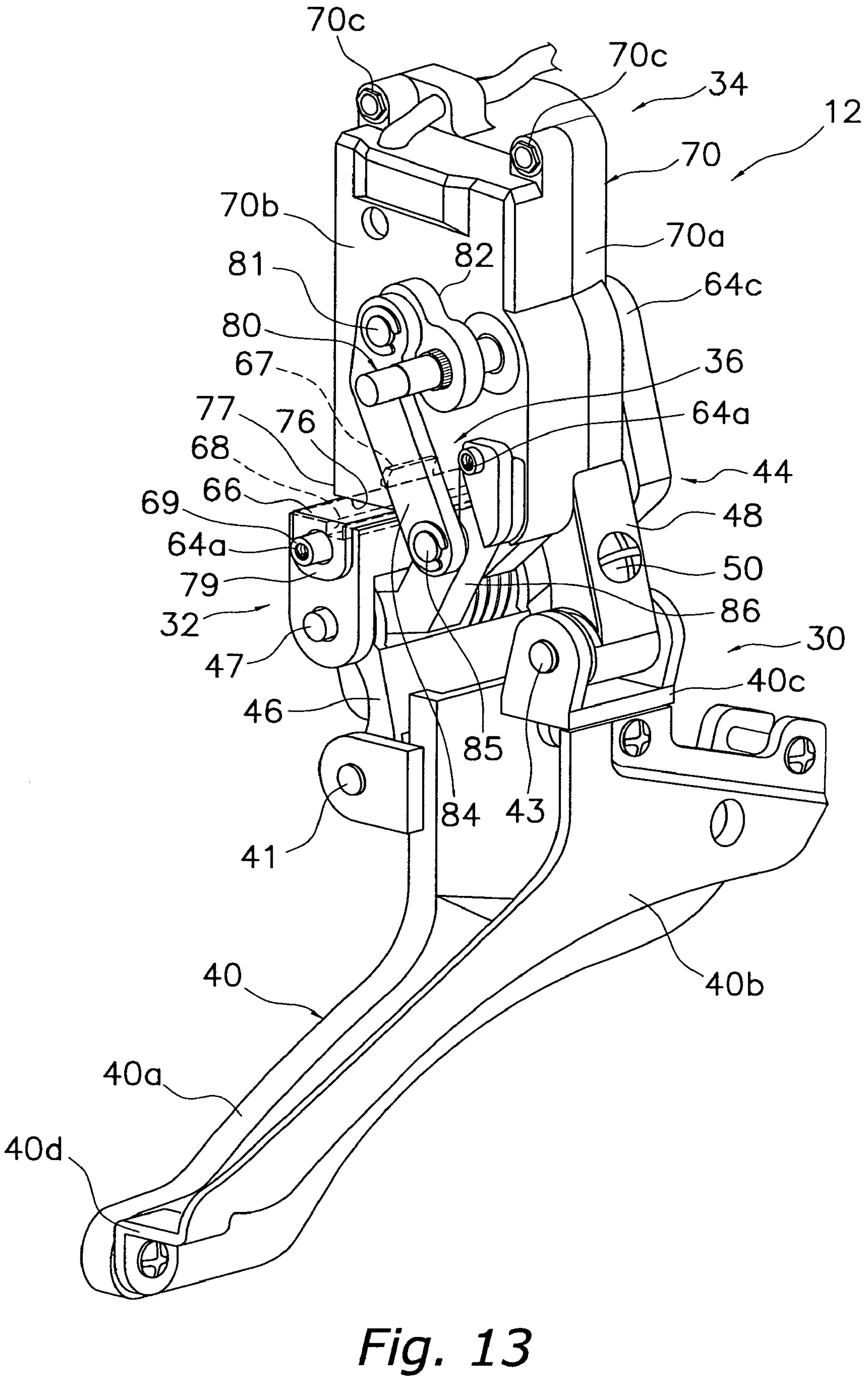
FIG. 13 is a rear, perspective view of the motorized front derailleur assembly illustrated in FIGS. 2-11, with the chain guide in the top position and with the motor unit cover removed for the purpose of illustration, and with portions illustrated as simplified shapes (e.g. the drive link and the saver link) for the purpose of illustration.
Figure 14:
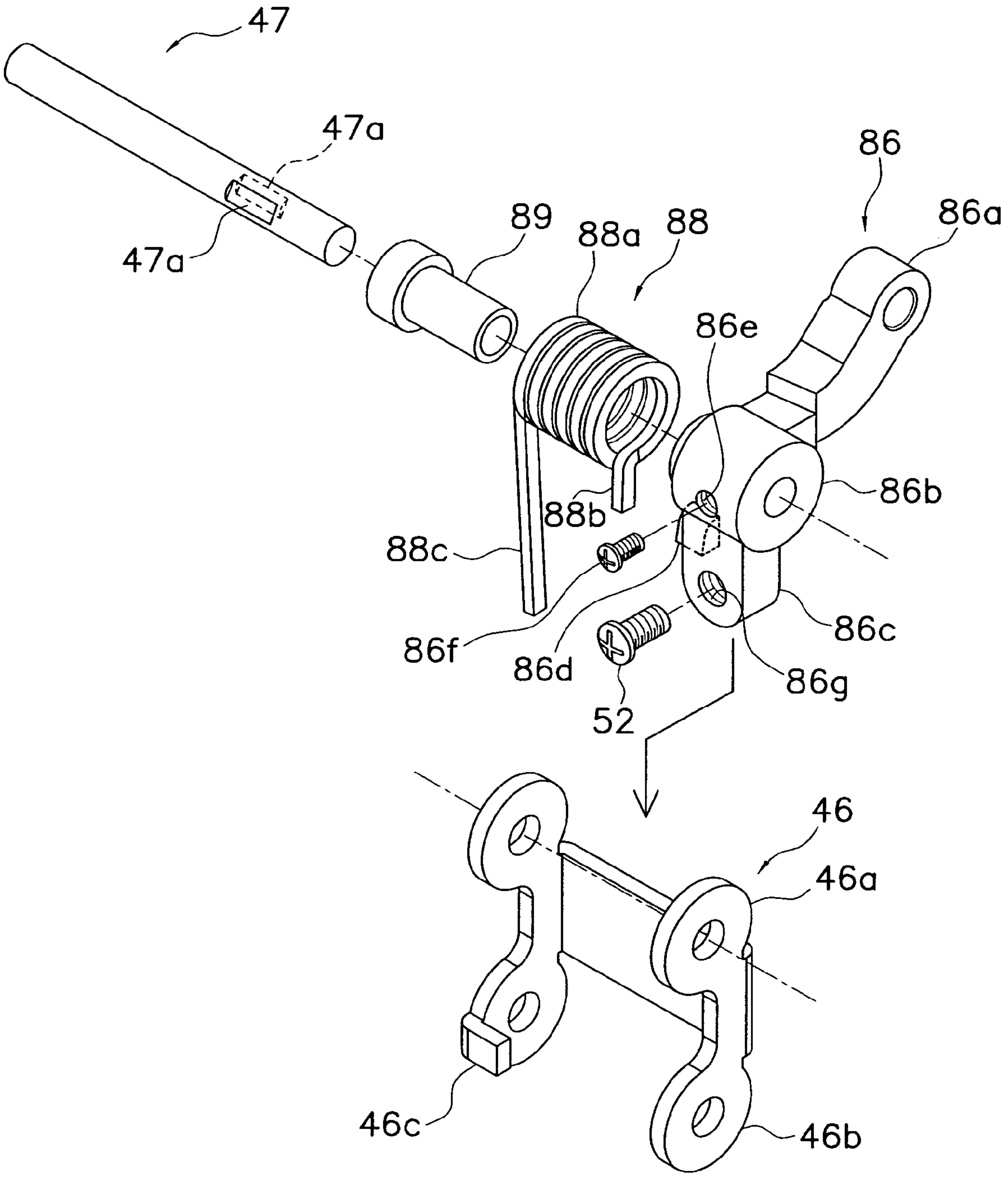
FIG. 14 is an enlarged, exploded perspective view of the inner link and saver link assembly (i.e. the jamming protection connection) of the motorized front derailleur assembly illustrated in FIGS. 2-13.
Figure 15:
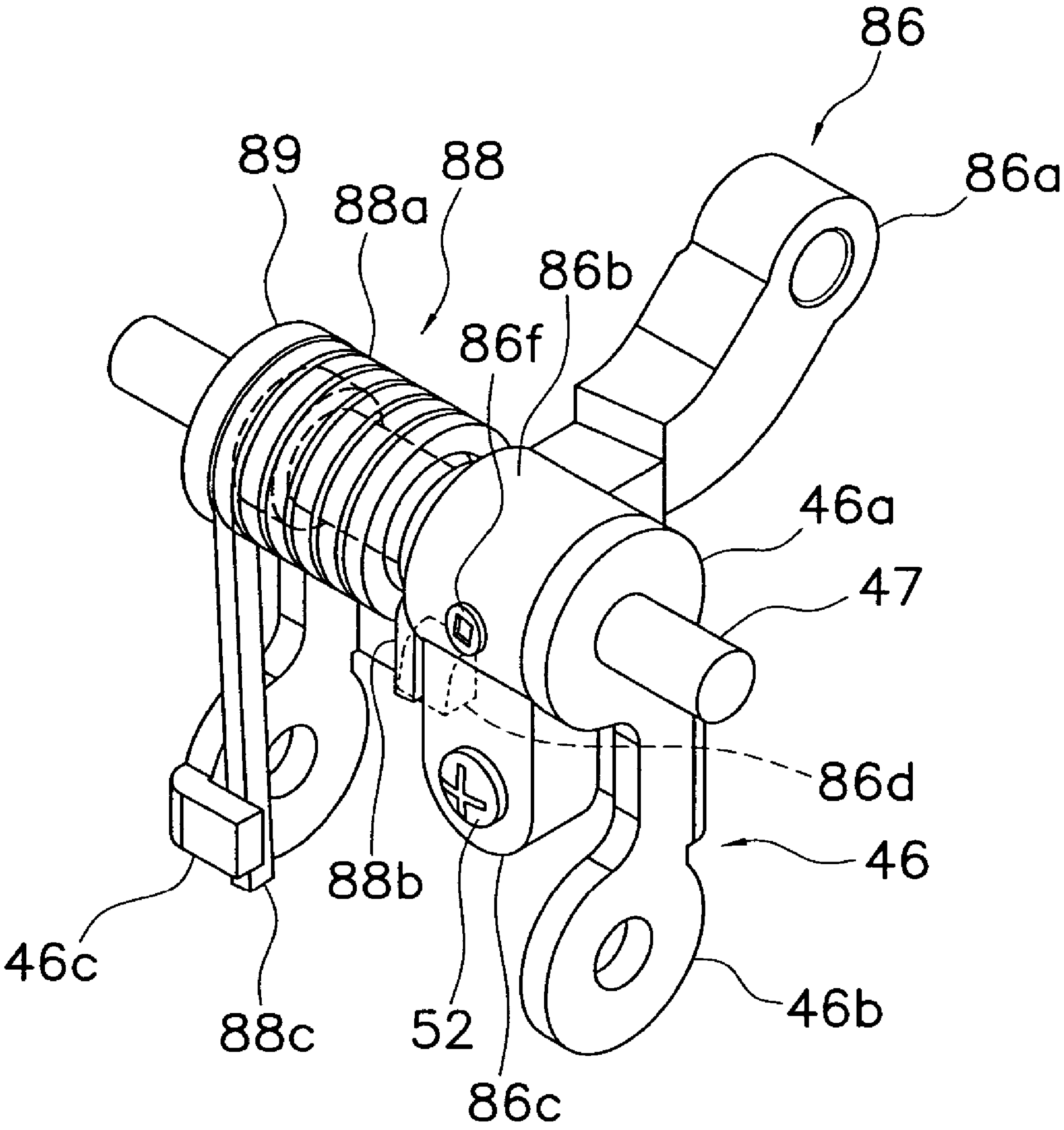
FIG. 15 is a perspective view of the inner link and saver link assembly (i.e. the jamming protection connection) illustrated in FIG. 14, in the assembled state.

The output shaft 80 is preferably rotatably supported in the housing 70 by at least one bearing. Of course, it will be apparent to those skilled in the art from this disclosure that one or more bearings can be mounted on the motorized derailleur mounting member 32 and/or the motor unit cover 74 in addition to or instead of being mounted within the housing 70 if needed and/or desired. In any event, the output shaft 80 is configured and arranged to rotate in opposite rotational directions about a rotational axis $A_1$ between a first rotational position (i.e. a low shift position orientation as shown in FIGS. 7, 11 and 12) and a second rotational position (i.e. a top shift position orientation as shown in FIGS. 9, 10 and 13) by rotation of the driving shaft of the internal motor structure 72.

The output shaft 80 includes an eccentric pin 81*a* that has a center axis $A_2$ that is offset from the rotational axis $A_1$ of the output shaft 80. The eccentric pin 81 is mounted to a first end 82*a* of a drive arm 82. The drive arm 82 has a second end 82*b* non-rotatably mounted on the rearwardly extending end of the output shaft 80 by a splined connection or the like. The eccentric pin 81 is rotatably mounted to in a hole formed in the first end 82*a* of the drive arm 82. The eccentric pin 81 is operatively coupled to the motor linkage 36. Thus, when the output shaft 80 is rotated, the eccentric pin 81 moves along a circular path around the rotational axis $A_1$ of the output shaft 80. When the motor unit cover 74 is mounted to the main motor unit mounting portion 64, the rearward end of the eccentric pin 81 is supported in the eccentric pin support slot 74*b* of the motor unit cover 74. Moreover, when the motor unit cover 74 is mounted to the main motor unit mounting portion 64, the stopper 74*e* is arranged to selectively contact the drive arm 82 to prevent further movement thereof.

Referring now to FIGS. 2-15 and 41-50, the motor linkage 36 basically includes a drive or motor link 84, a saver link 86 and a saver link biasing element 88. The motor linkage 36 is operatively coupled between the eccentric drive pin 81 of the output shaft 80 and the derailleur linkage 42. Specifically, the motor linkage 36 is operatively coupled between the eccentric drive pin 81 of the output shaft 80 and the inner link 46 of the derailleur linkage 42. The saver link biasing element 88 is operatively coupled between the saver link 86 and the inner link 46.

The inner link 46, the saver link 86 and the saver link biasing element 88 form a jamming protection connection between the motor linkage 36 and the derailleur linkage 42. In particular, part of the inner link 46, part of the saver link 86 and the saver link biasing element 88 form the jamming protection connection. This jamming protection arrangement is configured and arranged to move between a force transmitting state and a force override state. More specifically, the drive link 84 is pivotally mounted to the eccentric pin 81 and the saver link 86, while the saver link 86 is pivotally coupled to the drive link 84 and the inner link 46. The biasing element 88 is operatively coupled between the inner link 46 and the saver link 86 to normally maintain a rigid connection (i.e. a normally rigid state) therebetween, as explained below.

The jamming protection connection arranged between the drive link 84 and the inner link 46 such that the drive link 84 is permitted to move from an outer shift orientation to an inner shift orientation even if the chain guide 40 is prohibited from moving to the inner shift position from the outer shift position.

The drive link 84 is configured and arranged relative to the output shaft 80 and the derailleur linkage 42 to shift the chain guide 40 from the first (low) shift position to the second (top) shift position, and to the first (low) shift position from the second (top) shift position. The drive link 84 has a first drive link end 84*a* and a second drive link end 84*b*. The first drive link end 84*a* is rotatably mounted on the eccentric drive pin 81 of the output shaft 80 such that the eccentric drive pin 81 can rotate within the hole formed in the first drive link end 84*a*. The second drive link end 84*b* is pivotally coupled to the saver link 86 by a pivot pin 85. Thus, when the output shaft 80 is rotated, the drive link 84 is moved or shifted. The first drive link end 84*a* is preferably retained on the eccentric pin 81 by a C-clip, while the second drive link end 84*b* is preferably retained on the pivot pin 85 by another C-clip. When the motor unit cover 74 is mounted to the main motor unit mounting portion 64, the rearward end of the pivot pin 85 is supported in the additional pin support slot 74*c* of the motor unit cover 74.

The first drive link end 84*a* is operatively coupled to the output shaft 80 of the motor unit 34 via the eccentric pin 81 and the drive arm 82. The second drive link end 84*b* is operatively coupled to the inner link 46 of the front derailleur 30 to move the chain guide 40 from the inner shift position to the outer shift position when the first drive link end 84*a* is pulled in a direction away from the second drive link end 84*b*. In other words, the eccentric drive pin 81 is configured to selectively pull the first drive link end 84*a* in the direction away from the second drive link end 84*b* to shift the chain guide 40 from the inner shift position to the outer shift position and to selectively push the first drive link end 84*a* in a direction toward the second drive link end 84*b* to shift the chain guide 40 from the outer shift position to the inner shift position.

Figure 45:
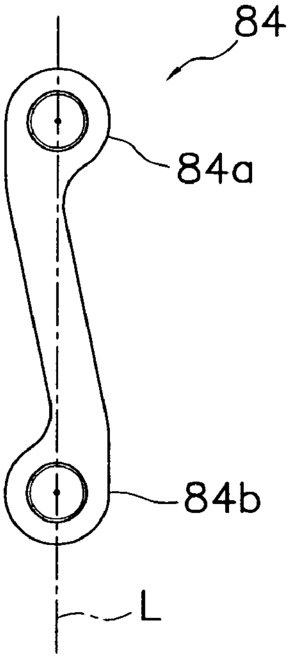
FIG. 45 is a rear elevational view of the drive link of the motor linkage of the motorized front derailleur assembly illustrated in FIGS. 2-13.
Figure 46:
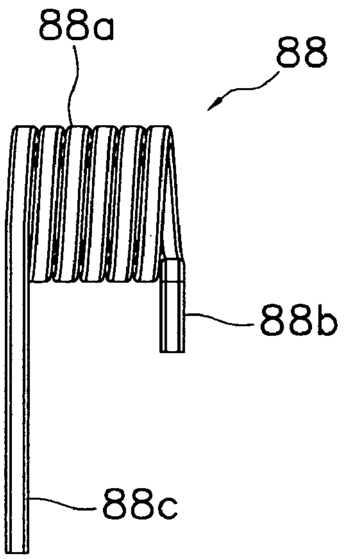
FIG. 46 is an inner side elevational view of the biasing element of the jamming protection connection of the motorized front derailleur assembly illustrated in FIGS. 2-13.
Figure 47:
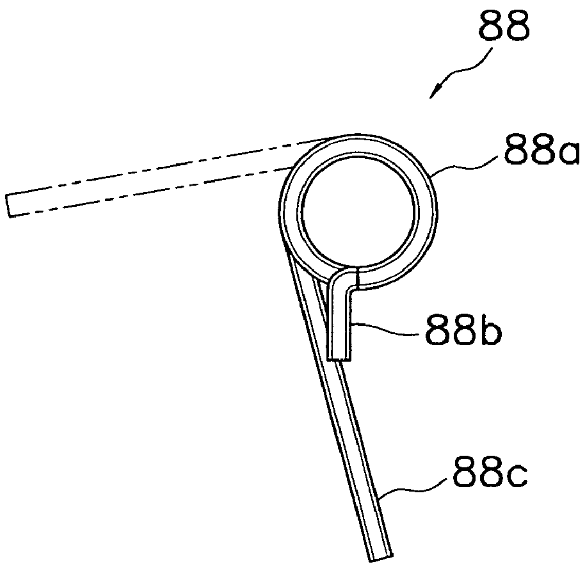
FIG. 47 is a rear elevational view of the biasing element illustrated in FIG. 46, showing the biasing element in the loaded (e.g. installed, deformed) state, and with the unloaded (e.g. pre-installed, pre-deformed) shape shown in phantom lines for the purpose of illustration.
Figure 48:
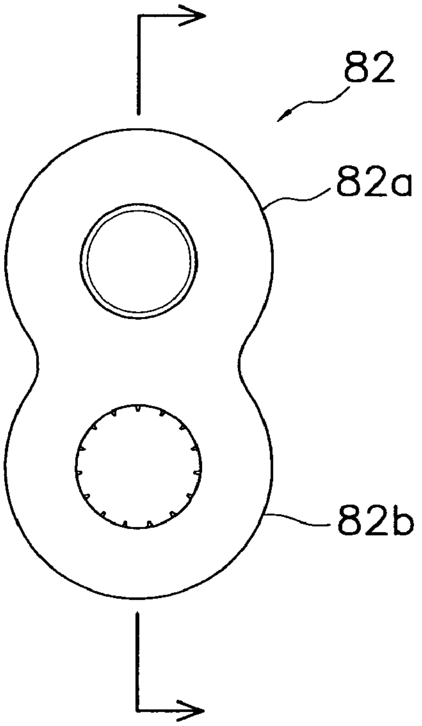
FIG. 48 is a rear elevational view of the drive arm of the output shaft of the motorized front derailleur assembly illustrated in FIGS. 2-13.
Figure 49:
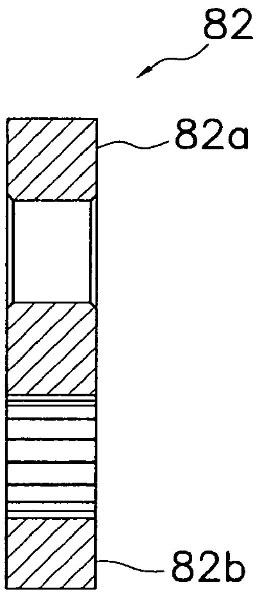
FIG. 49 is a cross-sectional view of the drive arm illustrated in FIG. 48, as seen along section line 49-49 of FIG. 48.
Figure 50:
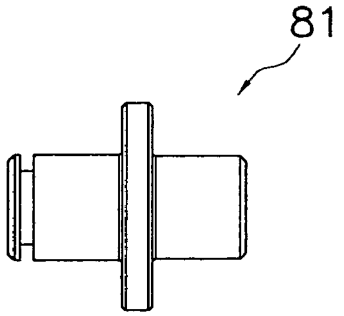
FIG. 50 is a side elevational view of the drive pin (i.e. eccentric pin) of the output shaft of the motorized front derailleur assembly illustrated in FIGS. 2-13.
Figure 51:
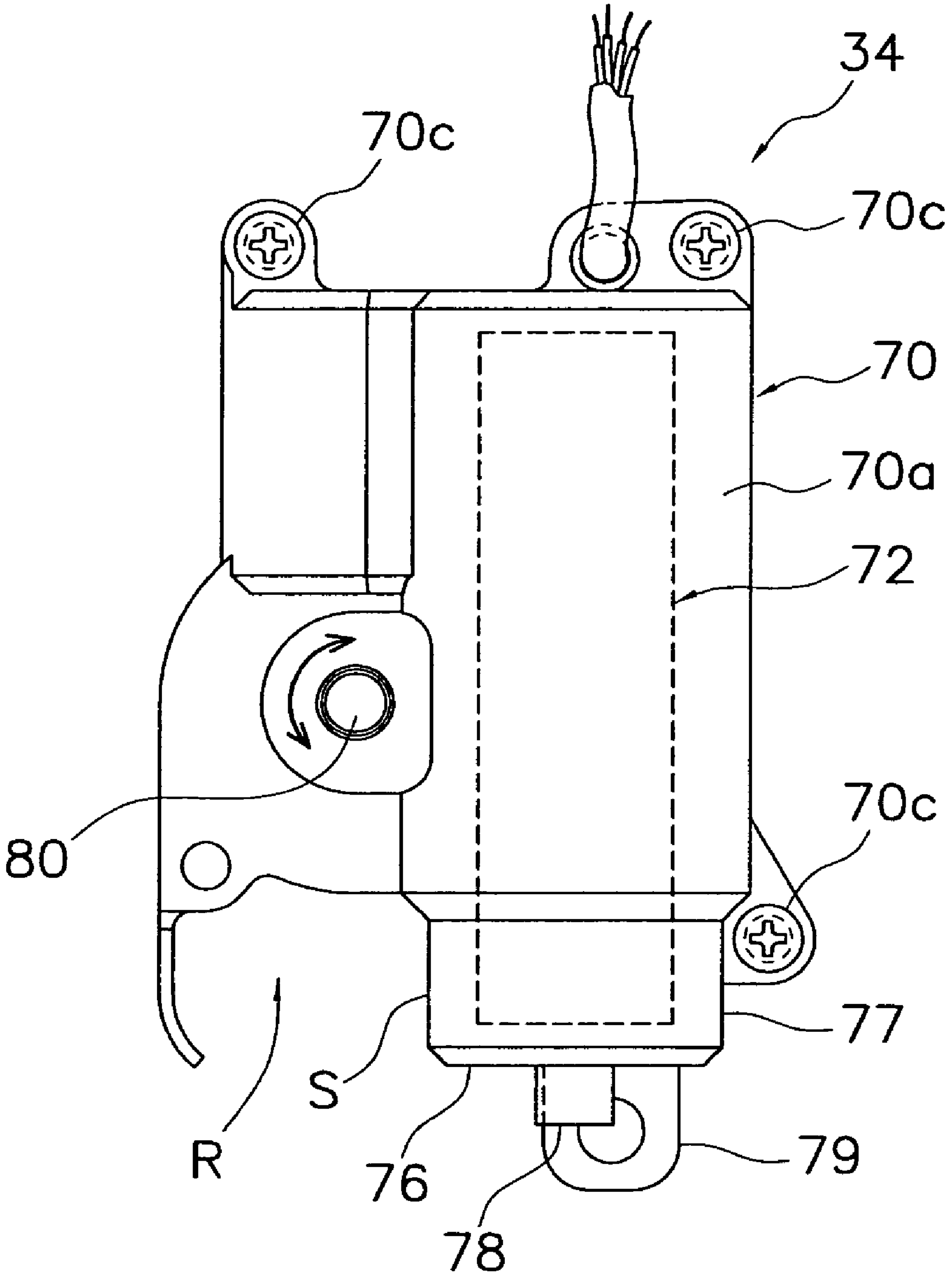
FIG. 51 is an enlarged front elevational view of the motor unit of the motorized front derailleur assembly illustrated in FIGS. 2-13.
Figure 52:
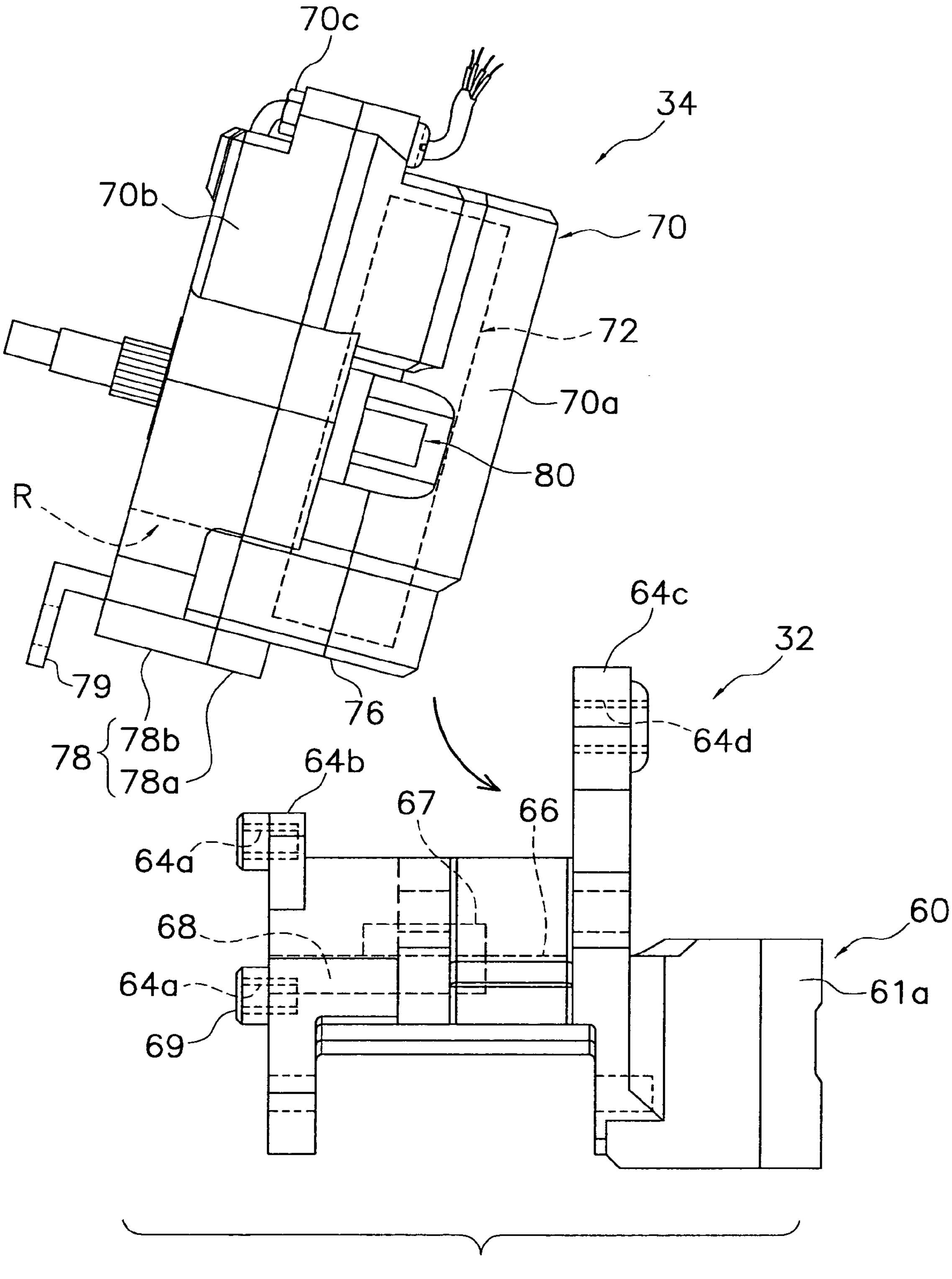
FIG. 52 is an enlarged side elevational view of the motor unit and the motorized front derailleur mounting member of the motorized front derailleur assembly illustrated in FIGS. 2-13 prior to coupling these parts together via first and second fastener-less mating structures.

The drive link 84 has a longitudinal axis L extending between the first and second drive link ends 84*a* and 84*b*. The longitudinal axis L of the drive link 84 has a first orientation (FIG. 7) when the chain guide 40 is in the first shift position and a second orientation (FIG. 9) when the chain guide 40 is in the second shift position with the first and second orientations of the longitudinal axis L of the drive link 84 being changed less than forty five degrees between the first and second orientations, as best seen in FIGS. 7 and 9. The longitudinal axis L preferably extends between the centers of the holes formed in the first and second drive link ends 84*a* and 84*b*, as best seen in FIG. 45.

The saver link 86 preferably has a first saver link end 86*a*, a second saver link end 86*b*, a control or stop flange 86*c* and an abutment tab 86*d*. The first saver link end 86*a* of the saver link 86 is pivotally coupled to the second drive link end 84*b* of the drive link 84 by the pivot pin 85. The pivot pin 85 is preferably press fitted in the hole of the first saver link end 86*a*, while the pivot pin 85 is rotatably received in the hole of the second drive link end 84*b*. The second saver link end 86*b* is operatively coupled to the inner link 46 of the derailleur linkage 42. In particular, the second saver link end 86*b* includes a through hole with the pivot pin 47 extending therethrough and a threaded bore 86*e* configured to receive a set screw 86*f*. The pivot pin 47 includes a pair of flat surfaces 47*a* configured to contact the set screw 86*f* to prevent rotation and axial movement of the pivot pin 47 relative to the saver link 86. The first inner link end 46*a* of the inner link 46 is rotatably mounted on the pivot pin 47.

The control or stop flange 86*c* extends from the second saver link end 86*b* and includes a threaded bore 86*g* configured to receive the top adjustment screw 52 therein such that the top adjustment screw 52 selectively contacts the inner link 46 when the motor linkage 36 is driven to the top shift position as best seen in FIGS. 9 and 10. Thus, the top adjustment screw 52 is configured and arranged to change the second or top shift position of the chain guide 40 relative to the fixing body 44 by the free end of the top adjustment screw 52 contacting the inner link 46. The abutment tab 86*d* extends axially from a front side of the control flange 86*c* to engage part of the biasing element 88.

As best seen in FIGS. 14, 15, 46 and 47, the saver link biasing element 88 is preferably a torsion spring having a coiled portion 88*a*, a first leg portion 88*b* and a second leg portion 88*c*. The coiled portion 88*a* is located about a bushing 89 mounted on the pivot pin 47, which connects the saver link 86 to the inner link 46. The first leg portion 88*b* of the saver link biasing element 88 engages the saver link 86, while the second leg portion 88*b* contacts the inner link 46 of the derailleur linkage 42. The saver link 86 is biased in a counterclockwise direction about the pivot point $P_3$ as viewed from the rear of the derailleur. On the other hand, the inner link 46 is biased in a clockwise direction about the pivot pin 47 as viewed from the rear of the derailleur.

Thus, the top adjustment screw 52 is normally biased toward the inner link 46 to contact the inner link 46, unless the low adjustment screw 50 or an obstruction (jam) prevents such contact. In other words, the saver link biasing element 88 is configured and arranged to apply an urging force that normally maintains a substantially rigid connection between the saver link 86 and the derailleur linkage 42 so that these members normally move substantially together as a unit, except when the low adjustment screw 50 limits inward movement of the derailleur linkage 42 or when an obstruction limits inward movement. Accordingly, the saver link 86 is pivotally coupled to the derailleur linkage 42 and the saver link biasing element 88 is operatively coupled between the saver link 86 and the derailleur linkage 42 to urge the saver link 86 from a force override state to the force transmitting state such that a substantially rigid connection is normally maintained between the saver link 86 and the derailleur linkage 42.

Thus, as seen in FIG. 11, if the chain guide 40 is stuck in the top position, and the motor linkage 36 is driven by the output shaft 80 to a low shift position, the saver link 86 will rotate in a clockwise direction in about the pivot point $P_3$ as viewed from the rear of the derailleur against the urging force the first leg portion 88*b* of the saver link biasing element 88 even though the inner link 46 does not move. Accordingly, a non rigid (jamming protection) connection is formed between the saver link 86 and the derailleur linkage 42 by utilizing the saver link 86 and the saver link biasing element 88. In other words, the saver link 86 and the saver link biasing element 88 form a non-rigid connection that connects motor linkage 36 to the derailleur linkage 42. This non-rigid connection forms the jamming protection connection.

Referring again to FIGS. 14 and 15, assembly and operation of the jamming protection connection will be explained in more detail. In particular, assembly and operating of the mounting member 32, the inner link 46, the pivot pin 47, the saver link 86, the biasing element 88 and the bushing 89 will be explained in more detail. During assembly of these parts, the biasing element 88 is mounted on the bushing 89 and placed adjacent the second saver link end 86*b*. The first leg portion 88*b* of the biasing element is located adjacent the abutment tab 86*d*. Next, the first inner link end 46*a* is placed with its mounting flanges on opposite ends of the bushing 89 and second saver link end 86*b* arrangement so that the respective holes are aligned. Next this assembly is placed between the first and second inner link mounting parts 62*a* and 62*b* so that all of the holes are aligned. The pivot pin 47 is then inserted through the first inner link mounting hole 62*e*, through a first flange of the inner link 46, through the second saver link end 86*b*, through the bushing 89 and the biasing element 88, through a second flange of the inner link 46 and into the second inner link mounting hole 62*f*. The set screw 86*f* is then mounted in the threaded hole 86*e* and rotated into contact with one of the flat surfaces 47*a*. The second leg portion 88*c* is then moved to engage a tab 46*c* of the second inner link end 46*b* of the inner link 46, and assembly is complete. Once the above assembly is completely assembled, the assembly is prevented from being removed from the motorized front derailleur mounting member 32 even though the pivot pin 47 is freely rotatable relative to the mounting member 32. In other words, the pivot pin 47 is freely rotatable and axially movable relative to the mounting member 32 until the set screw 86*f* is installed. Also, the pivot pin 47 is prevented from rotating relative to the saver link 86.

The pivot pin 47 is fixed to the saver link 86 due to the arrangement of the flat surfaces 47*a* and the set screw 86*f*, and freely rotatable relative to the inner link 46 and the motorized front derailleur mounting member 32. Specifically, the pivot pin 47 is rotatably mounted in the first and second inner pivot pin mounting holes 62*e* and 62*f* of the first and second inner link support parts 62*a* and 62*b*. However, the saver link biasing element 88 is configured and arranged to apply an urging force that normally maintains a rigid connection between the saver link 86 and the inner link 46 so that these members normally move substantially together as a unit. The coiled portion 88*a* of the biasing element 88 is mounted on the bushing 89, which is also rotatably mounted on the pivot pin 47. Thus, the inner link 46, the pivot pin 47 and the biasing element 88 all normally move together as a unit when the chain guide 40 is shifted between the top and low positions. In other words, the mounting arrangement of the pivot pin 47 provides for reduced friction when the chain guide 40 is moved between the top and low positions. In particular, the ends of the pivot pin 47 are freely rotatable in the motorized front derailleur mounting member 32 and the inner link 46, while fixed to the saver link 86. Accordingly, the pivot pin 47 moves with the saver link 86 and with the biasing element 88 so that friction does not occur between the pivot pin 47 and the coiled portion 88*a* of the biasing element 88 during movement of the chain guide 40. Moreover, because the inner link 46, the biasing element 88, the saver link 86 and the pivot pin 47 normally move together as a unit when the chain guide 40 is moved, no friction normally occurs between the inner link 46 and the pivot pin 47 or between the inner link 46 and the biasing element 88.

As mentioned above, even though the inner link 46, the biasing element 88, the saver link 86 and the pivot pin 47 normally move together as a unit when the chain guide 40 is moved, sometimes the saver link 86 will move relative to the inner link 46 (i.e. if the chain guide 40 becomes jammed in the top position or when the low adjustment screw 50 contacts the fixing body 44 when the chain guide 40 is moved to the low position). When the saver link 86 is moved relative to the inner link 46, friction can also be reduced. In particular, when the saver link 86 is moved relative to the inner link 46, the first leg portion 88*b* will move with the saver link 86. Initially, the coiled portion 88*a* may also adjust its rotational position relative to the bushing 89 (i.e. the coiled portion 88*a* can initially move around the bushing 89). However, after a predetermined amount of movement of the coiled portion 88*a*, the coiled portion 88*a* may bind on the bushing 89. Even if the coiled portion 88*a* binds on the bushing 89, because the bushing 89 is rotatable relative to the pivot pin 47 the bushing 49 can rotate with the coiled portion 88*a*. In other words, the positions of the coiled portion 88*a* and the bushing 89 relative to the first and second legs 88*b* and 88*c* can equalize because the bushing 89 can substantially float on the pivot pin 47. Because the pivot pin 47 rotates with the saver link 86, any relative movement between the bushing 89 and the pivot pin 47 will be minimized. Due to the above arrangement of the present invention, friction can be substantially reduced even when the saver link 86 moves relative to the inner link 46.

Adjustment of the motorized front derailleur assembly 12 will now be explained in more detail. The front derailleur unit 30 is mounted to the frame 12 by the motorized front derailleur mounting member 32 and bracket 18. Then the low and top shift positions are set/adjusted by adjusting the low and top adjustment screws 50 and 52. In particular, when the chain guide is in the top shift position so that the chain guide 40 is disposed over the front chain wheel 26, the top adjustment screw 52 is rotated until the desired alignment between the chain guide 40 and the sprocket 26 is obtained. This adjustment of the top shift position causes the relative orientation between the inner link 46 and the saver link 86 to change. In particular, the adjusting of the top adjustment screw 52 changes the relative orientation between the inner link 46 and the saver link 86 by counteracting the urging force of the saver link biasing element 88, i.e., by further compressing the saver link biasing element 88.

Once the top shift position has been set, the chain guide is shifted to the low position over the sprocket 28. Then the low shift position is also adjusted by the adjusting of the low adjustment screw 50 until the desired alignment between the chain guide 40 and the sprocket 28 is obtained. Thus, the low position is set by using the low adjustment screw 50, which contacts the fixing body 44, such that the chain guide 40 is disposed over the smaller front chain wheel 28. Of course, because the adjusting of the low adjustment screw 52 changes the relative orientation between the inner link 46 and the saver link 86 this process may need to be repeated until the desired alignments are obtained. In other words, after both the top and low positions are adjusted using the adjustment screws 50 and 52, the alignments should be checked. Of course, the low position can be adjusted prior to adjusting the top position, and then the positions can be checked if needed and/or desired.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, “including”, “having” and their derivatives. Also, the terms “member” or “element” when used in the singular can have the dual meaning of a single part or a plurality of parts. Finally, terms of degree such as “substantially”, “about” and “approximately” as used herein mean a reasonable amount of deviation of the modified term such that the end result is not significantly changed. These terms of degree should be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A motorized bicycle front derailleur assembly comprising: a motor unit configured and arranged to rotate an output shaft in a first rotational direction and a second rotational direction that is opposite the first rotational direction; a front derailleur including a fixing body configured to be mounted to a bicycle frame, an inner link pivotally coupled to the fixing body at a first pivot point, an outer link pivotally coupled to the fixing body at a second pivot point and a chain guide pivotally coupled to the inner and outer links to move between an inner shift position and an outer shift position, the first pivot point being located laterally closer to a center plane of the bicycle frame than the second pivot point; and a motor linkage directly coupled to the output shaft of the motor unit and directly coupled to the inner link of the front derailleur to move the chain guide from the inner shift position to the outer shift position upon rotation of the output shaft in the first rotational direction and to move the chain guide from the outer shift position to the inner shift position upon rotation of the output shaft in the second rotational direction, with the outer link of the front derailleur being separate from the motor linkage, the motor linkage includes a drive link having a first drive link end operatively coupled to the output shaft of the motor unit and a second drive link end operatively coupled to the inner link of the front derailleur to move the chain guide from the inner shift position to the outer shift position when the first drive link end is pulled in a direction away from the second drive link end, the output shaft includes an eccentric drive pin that is offset from a rotational axis of the output shaft, the first drive link end of the drive link is pivotally coupled to the eccentric drive pin such that the eccentric drive pin is configured to selectively pull the first drive link end in the direction away from the second drive link end to shift the chain guide from the inner shift position to the outer shift position and to selectively push the first drive link end in a direction toward the second drive link end to shift the chain guide from the outer shift position to the inner shift position, the motor linkage includes a jamming protection connection arranged between the drive link and the inner link such that the drive link is permitted to move from an outer shift orientation to an inner shift orientation even if the chain guide is prohibited from moving to the inner shift position from the outer shift position, the jamming protection connection includes a biasing element configured and arranged to apply an urging force that normally maintains the jamming protection connection in a normally rigid state, the jamming protection connection includes a saver link having a first saver link end pivotally coupled to the second drive link end and a second saver link end pivotally coupled to the inner link, and the biasing element is arranged between the saver link and the inner link to apply the urging force that normally maintains the saver link and the inner link in the normally rigid state.

2. The motorized bicycle front derailleur assembly according to claim 1, wherein the second saver link end is pivotally coupled to the inner link at the first pivot point.

3. The motorized bicycle front derailleur assembly according to claim 2, wherein the biasing element is a coil spring mounted on a pivot pin at the first pivot point with a first end of the coil spring engaged with the inner link and a second end of the coil spring engaged with the saver link.

4. The motorized bicycle front derailleur assembly according to claim 1, wherein the front derailleur further includes a mechanical adjustment device configured and arranged to change at least one of the inner and outer shift positions of the chain guide relative to the fixing body.

5. The motorized bicycle front derailleur assembly according to claim 4, wherein the mechanical adjustment device is configured and arranged to change both of the inner and outer shift positions of the chain guide relative to the fixing body.

6. The motorized bicycle front derailleur assembly according to claim 5, wherein the mechanical adjustment device includes a first adjustment screw configured and arranged to change the outer shift position of the chain guide relative to the fixing body.

7. The motorized bicycle front derailleur assembly according to claim 6, wherein the first adjustment screw is threadedly coupled to one of the inner link and the saver link, and the first adjustment screw is arranged and configured to contact the other of the inner link and the saver link to adjust the relative positions of the inner link and the saver link in order to change the outer shift position of the chain guide relative to the fixing body.

8. The motorized bicycle front derailleur assembly according to claim 6, wherein the mechanical adjustment device further includes a second adjustment screw configured and arranged to change the inner shift position of the chain guide relative to the fixing body.

9. A motorized bicycle front derailleur assembly comprising:

a motor unit configured and arranged to rotate an output shaft in a first rotational direction and a second rotational direction that is opposite the first rotational direction;

a front derailleur including a fixing body configured to be mounted to a bicycle frame, an inner link pivotally coupled to the fixing body at a first pivot point, an outer link pivotally coupled to the fixing body at a second pivot point and a chain guide pivotally coupled to the inner and outer links to move between an inner shift position and an outer shift position, the first pivot point being located laterally closer to a center plane of the bicycle frame than the second pivot point; and a motor linkage operatively coupled to the output shaft of the motor unit and the inner link of the front derailleur to move the chain guide from the inner shift position to the outer shift position upon rotation of the output shaft in the first rotational direction and to move the chain guide from the outer shift position to the inner shift position upon rotation of the output shaft in the second rotational direction, the motor linkage including a drive link having a first drive link end operatively coupled to the output shaft of the motor unit and a second drive link end operatively coupled to the inner link of the front derailleur to move the chain guide from the inner shift position to the outer shift position when the first drive link end is pulled in a direction away from the second drive link end, the motor linkage including a jamming protection connection arranged between the drive link and the inner link such that the drive link is permitted to move from an outer shift orientation to an inner shift orientation even if the chain guide is prohibited from moving to the inner shift position from the outer shift position, the jamming protection connection including a biasing element configured and arranged to apply an urging force that normally maintains the jamming protection connection in a normally rigid state, the jamming protection connection including a saver link having a first saver link end pivotally coupled to the second drive link end and a second saver link end pivotally coupled to the inner link, and the biasing element being arranged between the saver link and the inner link to apply the urging force that normally maintains the saver link and the inner link in the normally rigid state.

10. The motorized bicycle front derailleur assembly according to claim 9, wherein the saver link is pivotally coupled to the inner link at the first pivot point, and the biasing element is a coil spring mounted on a pivot pin at the first pivot point with a first end of the coil spring engaged with the inner link and a second end of the coil spring engaged with the saver link.

11. The motorized bicycle front derailleur assembly according to claim 10, wherein the pivot pin is non-rotatably coupled to one of the saver link and the inner link, and the pivot pin is rotatably supported by the fixing body.

12. The motorized bicycle front derailleur assembly according to claim 9, wherein the front derailleur further includes a mechanical adjustment device having a first adjustment screw configured and arranged to change the outer shift position of the chain guide relative to the fixing body, and the first adjustment screw is threadedly coupled to one of the inner link and the saver link, and the first adjustment screw is arranged and configured to contact the other of the inner link and the saver link to adjust the relative positions of the inner link and the saver link in order to change the outer shift position of the chain guide relative to the fixing body.

13. The motorized bicycle front derailleur assembly according to claim 1, wherein the inner link is pivotally coupled to part of the motor linkage via a pivot pin that is rotatably supported by the fixing body and non-rotatably coupled to one of the inner link and the part of the motor linkage, and the biasing element is a coil spring that is mounted on the pivot pin with a first end engaged with the inner link and a second end engaged with the part of the motor linkage.

14. The motorized bicycle front derailleur assembly according to claim 1, wherein the front derailleur further includes a mechanical adjustment device configured and arranged to change at least one of the inner and outer shift positions of the chain guide relative to the fixing body.

15. The motorized bicycle front derailleur assembly according to claim 1, wherein the drive link has a longitudinal axis extending between the first and second drive link ends, and the longitudinal axis of the drive link normally has an outer shift orientation when the chain guide is in the outer shift position and an inner shift orientation when the chain guide is in the inner shift position with the inner and outer orientations of the longitudinal axis of the drive link being changed less than forty five degrees.

* * * * *